United States Patent [19]

Yamagata et al.

[11] Patent Number: 5,048,113

[45] Date of Patent: Sep. 10, 1991

[54] CHARACTER RECOGNITION POST-PROCESSING METHOD

[75] Inventors: Hideaki Yamagata, Yokohama; Keiji Kojima, Kawasaki; Tatsuhiko Hashimoto, Sagamihara, all of Japan

[73] Assignee: Ricoh Company, Ltd., Japan

[21] Appl. No.: 483,023

[22] Filed: Feb. 21, 1990

[30] Foreign Application Priority Data

Feb. 23, 1989 [JP] Japan .................................. 1-43983
Feb. 28, 1989 [JP] Japan .................................. 1-48338
Jan. 11, 1990 [JP] Japan .................................. 2-3950

[51] Int. Cl.⁵ .................................................. G06K 9/03
[52] U.S. Cl. ......................................... 382/57; 382/40
[58] Field of Search ............................. 382/40, 57, 34

[56] References Cited

U.S. PATENT DOCUMENTS 4,491,965  1/1985  Yoshimura ............................ 382/57
4,860,376  8/1989  Tanaka et al. ........................ 382/57

FOREIGN PATENT DOCUMENTS 57-162086  10/1982  Japan .
57-162087  10/1982  Japan .
61-39175   2/1986   Japan .
63-30991   2/1988   Japan .
63286578   5/1990   Japan .................................. 382/57

Primary Examiner—Leo H. Boudreau
Assistant Examiner—David Fox
Attorney, Agent, or Firm—Mason, Fenwick & Lawrence

[57] ABSTRACT

A character recognition post-processing method includes the steps of, extracting a reference character from a predetermined character string obtained by recognizing a character in the document, recognizing a character in the document, comparing characteristic of the reference character and same type characteristic of other characters in the character string, and correcting on the basis of results of the comparison, recognition results of characters other than the reference character and in the character string.

25 Claims, 15 Drawing Sheets

FIG. 4
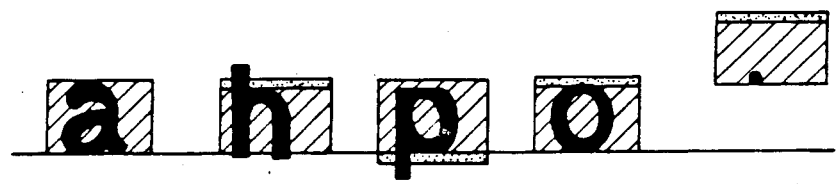
 HEIGHT OF REFERENCE CHARACTER
 JUDGEMENT THRESHOLD
FIG. 5
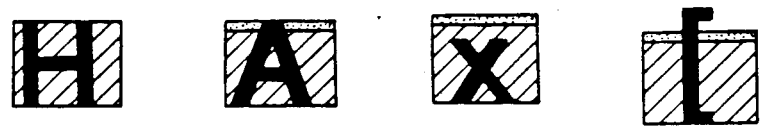
 HEIGHT OF REFERENCE CHARACTER
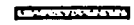 JUDGEMENT THRESHOLD

CHARACTER RECOGNITION POST-PROCESSING METHOD

BACKGROUND OF THE INVENTION

The present invention relates to a character recognition post-processing method, and in particular, relates to a method for character recognition post-processing in order to obtain a correct recognition result by correcting recognition results for each character in a sentence (such as an English language sentence and the like) comprising spaces and character strings separated by spaces.

Conventional technology relating to character recognition and having the English language as its object is such as "A character separation method stressing the size and position of characters in English language character recognition processing" (disclosed in Suzuki et. al, 1988 Electronic Information and Communications Society Spring National Conference, Preliminary Edition, Vol.1, page 191). In the technology disclosed in this literature, it is taken as a premise that the height of each of the characters in a line is the same. Thus, a histogram using the lower end and the upper end of a rectangle in contact with the outer edges of the characters in the line is used as the basis to extract two reference lines. The relationship of the positions between the characters and these reference lines is used to classify the characters in the line. This technology is termed Conventional Technology A.

Apart from this technology, there is also disclosed in Japanese Patent Laid Open Publication No.162087-1982 an optical character reading apparatus. In this optical character reading apparatus, the position relationship with the y-coordinate of the character images before and after and the appropriateness of the relationship with the recognition results are investigated and those results are used as the basis for increasing the reliability of the recognition results. This technology is termed Conventional Technology B. In addition, in Japanese Patent Laid Open Publication No.162086-1982 is described a method for improving the reliability of the recognition results by using the difference between the center of a character image and a bottom point and which is held in a dictionary as a bottom point compensation value, and using this bottom point compensation value to perform compensation. This technology is termed Conventional Technology C. Furthermore, in Japanese Patent Laid Open Publication No.39175-1986 is disclosed a method for correcting the results for determining the character type in the case of similar characters, according to the type of character before and after that character. This technology is termed Conventional Technology D. Still furthermore, in Japanese Patent Laid Open Publication No.30991-1988 there is disclosed a character recognition apparatus. In this disclosed character recognition apparatus, the character type and order of a first candidate character is used as the basis for determining a character for which correction is necessary and for determining a character type after correction. The same character type as that judged to be the character type after correction are selected from the characters in the recognition candidate character group with respect to the characters for which correction is necessary. The recognition candidate character for the character type and which is selected is made the first candidate character. This technology is termed Conventional Technology E.

The following problems exist with each of conventional technologies that have been described above.

When the sentences which are the object of recognition are skewed in the case of Conventional Technology A, it is difficult to obtain the peaks for the heights obtained from the histogram. Accordingly, it becomes necessary to perform skew compensation. In addition, the processing is performed in line units and so processing cannot be performed for sentences in which the font size changes within the line. Furthermore, the coordinates of the top end and the bottom end of the rectangle in contact with the periphery of the character are used and so the influence of noise is great.

Conventional Technology B cannot specify whether the recognition of a character was correct or incorrect in cases where there is a contradiction in the relationship that a character to be processed has with the characters before and after it.

Accordingly, there is an increase in the number of reject characters.

Conventional Technology C has difficulty in handling sentences where there are multiple fonts because there is a difference in the bottom point compensation values depending upon the font used.

With Conventional Technology D, it is taken as a premise that the type of character to be processed and the type of the characters before and after it are the same but there is no guarantee that this relationship realizes generally. In addition, if Conventional Technology D is applied to alphanumeric character OCR as it is, then the number of characters recognized as similar increases so that it is difficult to correct them.

With Conventional Technology E, the selection of first candidate character types is used as the basis for determining the type of character string. If pattern matching so as to increase the degree of reliability of the first candidate character type is not performed, then it is not possible to correctly judge the character type. Accordingly, it is difficult to apply Conventional Technology E to multiple fonts.

SUMMARY OF THE INVENTION

Accordingly, a general object of the present invention is to provide a novel and useful character recognition post-processing method in which the disadvantages of the aforementioned prior are eliminated.

When English language characters expressed in multiple fonts or multiple sizes are recognized, it is extremely difficult to distinguish between characters (such as the number 1 and the letter l, for example) where the shapes are similar, characters where the upper case and lower case are similar (such as the upper case V and the lower case v, for example), and similar marks (such as, and ', for example).

Accordingly, one of the objects of the present invention is to provide a character recognition post-processing method that can correctly recognize similar characters in character groups of multiple fonts and multiple sizes.

The above objects of the present invention can be achieved by a character recognition post-processing method for performing after the recognition of a character written in a document comprising the steps of, extracting a reference character forming a reference with respect to correction the recognition results from a predetermined character string obtained by recognizing a character in the document, comparing characteristic of said reference character and same type characteristic of other character in said character string, and correcting on the basis of results of said comparison, recognition results of characters other than said reference character and in said character string.

In addition, another object of the present invention is to provide a character recognition post-processing method that can correctly recognize each of the characters in a skewed character string.

The above-mentioned objects of the present invention can be also be achieved by a character recognition post-processing method as described above wherein recognition results are corrected in order of from the reference character to successively adjacent characters, and further comprising the steps of correcting recognition results for each character, on the basis of comparison results for the reference position and the position of each character in a perpendicular direction with respect to a line, and correcting a reference position on the basis of a position of each character in a perpendicular direction with respect to a line, and where a position of the reference character in a perpendicular direction with respect to a line is initial value, said corrected reference position being applied to successively adjacent characters.

Other objects and further features of the present invention will be apparent from the following detailed description when read is conjunction with the accompanying drawings.

BRIEF DESCRIPTION OF THE DRAWINGS

FIG. 4 is a view indicating an example of attribute judgment according to the height of character images when a reference character for the absolute lower-case height has been selected;

FIG. 5 is a view indicating an example of attribute judgment according to the height of character images when a reference character for the absolute upper-case height has been selected;

DESCRIPTION OF THE PREFERRED EMBODIMENT

Figure 1:
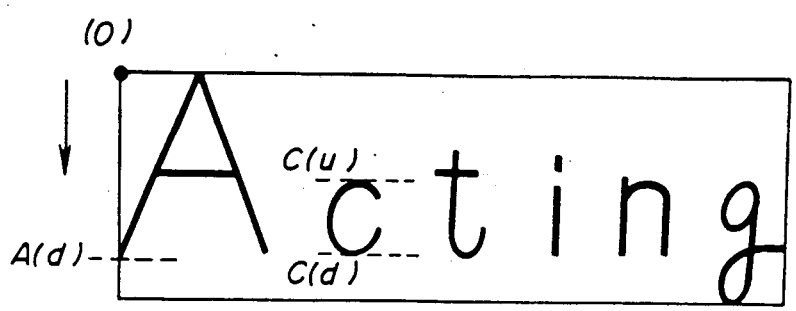
FIG. 1 is a view indicating information relating to the position of a character in a character string.

The character recognition processing that the present invention takes as a premise can be that processing which has been proposed conventionally. For example, the character recognition processing that is disclosed in U.S. Pat. No. 4,757,551 is used here. In outline, this character recognition processing can be described as follows.

A scanner scans a document and the image data obtained is checked for character image data. The features are then extracted from this character image data. These extracted features are compared with characteristic character patterns in a dictionary and the character most similar to an input character pattern is selected as the recognition result. The first candidate character which is most similar (distance $D_1$) to the input character pattern, and the second candidate character which is next similar (distance $D_2$) to the input character pattern, and so on are obtained as the recognition results.

The following is a description of the present invention.

In the case where characters in an English language document are to be recognized, the characters that form the reference (hereinafter known as reference character) is extracted from the characters which comprise the character strings between space namely the word.

For example, the character is selected as reference character when they satisfy all or some of the following conditions (a) through (d).

(a) Character with a high degree of reliability for the recognition result (recognition characteristic)
(b) Character that are difficult to recognize erroneously (recognition characteristic)

(c) Relative heights of the character image are stable in all of the fonts used in the document (character characteristic)

(d) Base line positions (to be described later) of the area division line of the character image are stable in all of the fonts used in the document (character characteristic)

The above described conditions (a) and (b) are dependent upon the recognition system. For example, in the case of a recognition system that uses simple pattern matching, condition (a) is defined by the following relationship $$E = \frac{(D2 - D1)}{D1}$$

When the distance between the input pattern and the first candidate character is D1, and when the distance between the second candidate character is D2. When $E > \beta$ (threshold value), there is a high reliability for the recognition results. However, when $E \leq \beta$, there is a low reliability for the recognition results.

With respect to the above conditions (b) and (c), it is possible to pre-evaluate the characters on the basis of empirical knowledge. For example, depending upon the font, the letter "t" has large differences in the relative height of the character image (and there are fonts where its height is the same a that of the letter "h" and others where it is not so high), and so it is not appropriate to use it as a reference character.

When a reference character is extracted from a character string, the height and/or the position of this reference character are used as the basis for correction of the recognition results for the other characters in that character string.

The "height" of a character image corresponds to the character size in the direction vertical with respect to that line. This "height" of the character image is, for example, the difference between the position of the top end of the character image and the position of the bottom end of the character image. As indicated in FIG. 1, when a character string that is the object of recognition post-processing is extracted as a character image in a rectangular region, then the upper left corner (o) of that rectangular region becomes the origin. Accordingly, the difference $\{A(d) - (o)\}$ between the upper position (o) and the lower position A(d) of the character image "A" indicated in FIG. 1 is the "height" of the character image "A". The height of the character image "c" showed FIG. 1 is the difference $\{c(d) - c(u)\}$ between the upper position c(u) and the lower position c(d) of the character image "c".

The "position" of a character image is the position in the direction perpendicular with respect to the line and for example, and either the position of the bottom end of the character image, or the position of the lower reference line of the area division line of the character image can be used. The "position" of the character image "A" indicated in FIG. 1 is for example, A(d). In the same manner, the "position" of the character image "c" is c(d). The area division line described above for the character image is the line that surrounds the (single character) character image that is to be recognized.

In the case of characters which are not reference characters within a character string, the recognition results are corrected in the following manner.

On the basis of the height and/or the position of the reference character, attribute judgment is performed for the other characters from the height and/or the position of these other characters in the character string. When the characters having judged attribute differ from the first candidate character which is a recognition result, a character having the appropriate attribute is selected from a second or third, fourth,,, candidate character. Correction of the recognition results is then performed by replacing the selected character with the first candidate character.

In addition, tables of similar characters are created for characters that are easily mistaken. When there is no character amongst the candidate characters and provided with the attributes that have been judged, it is possible that tables are referred to and the appropriate character is selected.

The judgment of the attributes for which the height of the character image is the reference is performed in the following manner.

For example, the height (h) of a reference character image and the height (H) of another character image are compared. As the results of this comparison, one of the following three attributes is determined with respect to the character image that forms the object of comparison with the reference character.

(1) The difference $|H - h|$ is smaller than a predetermined threshold value.

(2) The difference $|H - h|$ is larger than a predetermined threshold value, and $H > h$ (3) The difference $|H - h|$ is larger than a predetermined threshold value, and $H < h$ The above described threshold value is determined to a suitable value on the basis of the type of character, the font, and the size of the character that is the object.

Table 1 indicates those characters that have the above attributes (1) through (3) for when there is a reference character with a height equivalent to an upper case character (A,B,C, ...)(i.e. a case where the reference character has the absolute upper case character height) In addition, Table 2 indicates those characters that have the above attributes (1) through (3) for when there is a reference character with a height equivalent to an lower case character (a,b,c, ...)(i.e. a case where the reference character has the absolute lower case character height).

TABLE 1

(Height attributes for characters where the reference character has the absolute upper case character height)

(1) the difference |H-h| is smaller than a predetermined threshold value. (Reference character has the absolute upper case character height)
A B C D E F G H I J K L M N O P Q R S T U V W X Y Z
b d f g h i j k l p q y
0 1 2 3 4 5 6 7 8 9 etc.
(2) The difference |H-h| is larger than a predetermined threshold value, and H > h (Reference character exceeds the absolute upper case character height)
{ } / etc.
(3) The difference |H-h| is larger than a predetermined threshold value, and H < h (Reference character is lower than the absolute upper case character height)
a c e m n o r s u v w x z
. , ' " etc.

TABLE 2

(Height attributes for characters where the reference character is higher than the absolute lower case character height)

(1) The difference $|H-h|$ is smaller than a predetermined threshold value. (Reference character has the absolute lower case character height)
a c e m n o r s t u v w x z etc.
(2) The difference $|H-h|$ is larger than a predetermined threshold value, and $H > h$ (Reference character exceeds the absolute lower case character height)
A B C D E F G H I J K L M N O P Q R S T U V W X Y Z
b d f g h i j k l p q t y
0 1 2 3 4 5 6 7 8 9 etc.
{ } / etc.
(3) The difference $|H-h|$ is larger than a predetermined threshold value, and $H < h$ (Reference character is lower than the absolute lower case character height)
. , ' " etc.

Accordingly, the recognition results are corrected when there is no first candidate character as the recognition result for the character image within that character group (Refer to Table 1 or Table 2) having the attributes that have been judged for that character image that is the object of comparison. For example, if there is a second candidate character as the recognition result for the character image within that character group, then character is selected as the new first candidate character.

The judgment of the attribute where the position of the character image is the reference is performed in the following manner.

For example, the position ($P_0$) of the reference character and the position (P) of another character image are compared. As the result of this comparison, one of the following three attributes is determined with respect to the character image that is the object of comparison with the reference character.

(4) The difference $|P-P_0|$ is greater than a predetermined threshold value and $P > P_0$ (Position lower than reference character position)
(5) The difference $|P-P_0|$ is smaller than a predetermined threshold value
(6) The difference $|P-P_0|$ is larger than a predetermined threshold value, and $P < P_0$ (Position higher than reference character position)

Table 3 indicates those characters that have the above attributes (4) through (6).

The correction of the recognition results on the basis of these characters "positions" is also performed in the same manner as the "height" as has been described above.

TABLE 3

(Position Attribute)

(4) The difference of the positions exceeds a predetermined threshold value, and the character is lower than a reference character
j p q y
, etc.
(5) The difference is smaller than a predetermined threshold value (equal to the position of the reference character)
A B C D E F G H I J K L M N O P Q R S T U V W X Y Z
a b c d e f g h i j k l m n o p q r s t u v w x y z
0 1 2 3 4 5 6 7 8 9
. etc.
(6) The difference of the positions exceeds a predetermined threshold value, and the character is higher than a reference character TABLE 3-continued (Position Attribute)

' " etc.

The correction of the recognition results on the basis of this character "position" is performed in accordance with Table 3, in the same manner as the correction of the recognition results on the basis of the character "height" as described above.

The threshold value in order to determine the attributes (4) through (6) above, is determined as a suitable value on the basis of the type, font and size of the character which is the object. By the suitable selection of this threshold value, it is possible to reduce the influence of noise. In addition, this threshold value can be changed so as to correspond with the height of the reference character image. For example, it is possible to make the threshold value the product of a coefficient and the height of a reference character. If the threshold value is varied in this manner, then it is possible to have correct judgement of the attributes even if there are changes in the font size or the read density of the image.

The reference character is determined by a search through the character string to find the character which satisfies the condition found first. Furthermore, in order to improve the degree of accuracy of correction of the recognition results, all of the characters that satisfy the conditions can be extracted as reference character candidates and the character that has the highest reliability can be extracted from among them.

More specifically, it is possible to select the reference character from among those reference character candidates with the absolute upper case character height or from among those reference character candidates with the absolute lower case character height and which have a high reliability of being judged from the preciously described evaluation coefficient E, for example. In this method, when selection cannot be performed to the same degree of reliability, then the respective reference character candidates are made reference characters and used to judge the reliability from the correction results. These judgement results can be used as the basis for the selection of the most suitable reference character from among the reference character candidates. For the reference characters among the reference character candidates and which have the absolute upper case character height or those reference characters from among the reference character candidates and which have the absolute lower case character height, the previously described evaluation coefficient is used as the basis for the selection of the candidate that has the highest reliability. Alternatively, the respective candidate characters can be used to perform a check can be performed for contradictions in the correction results and in the case where a contradiction is found, a candidate with a higher reliability can be selected as the reference character.

Furthermore, when a character that satisfies the reference character conditions is not found among the character string that forms the object, then it is possible to substitute a reference character from another character string. However, if a document having multiple sizes is used as the object, then the judgement standard should be determined so that a character string having a different size is not used as the reference character.

It is possible for the position information (hereinafter, termed the reference position) for the reference character to change. The reference position is corrected in accordance with the following method, for example.

In the character string indicated in FIG. 1, the reference position is successively corrected when each of the characters has recognition results correction performed in order from the character "A" at the left end to the character "g" at the right end.

The reference position does not correct on the basis of characters for which the value of the position information compensation coefficient $\alpha$ differs greatly according to fonts, like characters which are recognized as "".

(A) The position of a character image in a character string is compared with the reference position. Only when the difference between the two is less than a predetermined threshold value is the position of that character image made the new reference position. Then, correction of the recognition results is performed for the next character on the basis of this new reference position.

(B) A new reference position is determined in accordance with the following formula, and to correspond with the recognition results (first candidate character) which have been corrected on the basis of the each information for the reference position and the height (hereinafter referred to as the reference height) of the reference character.

$$P = B + \alpha \times H \quad (1)$$

Where:
- $\alpha$: Fixed compensation coefficient for the first candidate character after correction (position information compensation constant)
- B: Position information for character image (position coordinate of bottom end or lower division line)
- H: Height of character image
- P: Corrected position coordinate of bottom end or lower division line)

(C) The position of a character image in a character string is compared with the reference position. The position of that character image is made the new reference position when the difference between the two is less than a predetermined threshold value. Moreover, if the difference between the two is greater than a predetermined threshold value, the new reference position is determined in accordance with (B).

The correction method for the character recognition results according to the present invention has predetermined character strings as the processing units and so it is possible to perform accurate correction even when there are changes in the font size in those character string units. In addition, when successive correction is performed for the reference position inside character strings, then there is no adverse influence even if the read character recognition results correction that has a high reliability.

The following will describe an example of an embodiment according to the present invention, with reference to the appended drawings.

Figure 2:
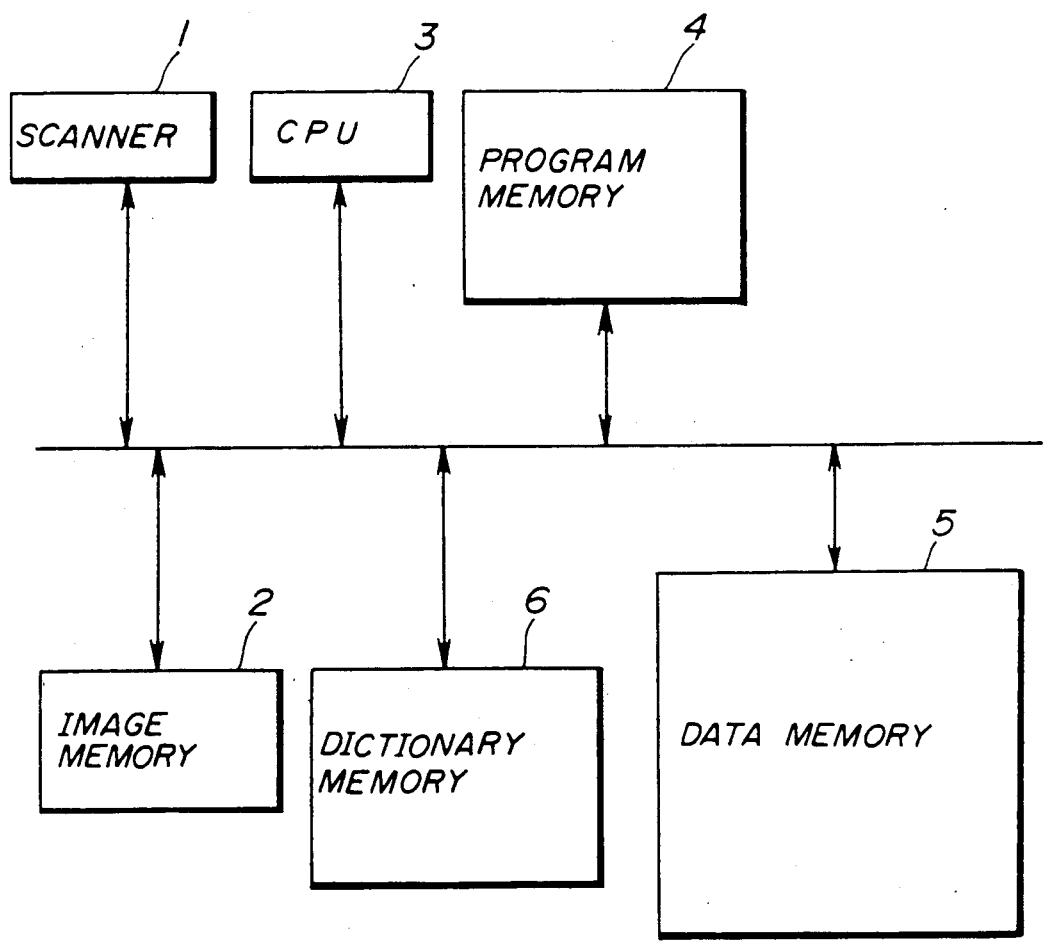
FIG. 2 is view indicating the configuration of hardware of one example of a character recognition apparatus according to the present invention.

FIG. 2 indicates a configuration of the hardware of a character recognition apparatus.

A scanner 1 scans an English language document and outputs image data (binary data) corresponding to that English language document. The image data output from the scanner 1 is stored in an image memory 2. A central processing unit 3 separates the characters, extracts the features, performs dictionary refer and other processing relating to character recognition for the image data that is stored in the image memory 2, and also performs the post-processing. The central processing unit 3 performs processing on the basis of a program and parameters stored in a program memory 4. According to the character recognition processing of the central processing unit 3, the features of the separated individual character images are extracted and the extracted features are compared with an referred against each of the characters in the dictionary memory 6. Then, candidate characters are selected from a first candidate having a smallest distance to a maximum nth candidate in order of distance. In addition, the data that is used for the post-processing (correction processing of the recognition results) relating to the present invention is also extracted. This extracted data is stored in the data memory 5. A confusion table that determines characters similar to each of the characters is stored in either the dictionary memory 6 or the program memory 4. In addition, inside the data memory 5 the areas corresponding to the types of the processing of the central processing unit 3 are determined, and in the each area the data obtained by the processing corresponding to the area are stored.

The following is a description of an embodiment relating to the character recognition post-processing (recognition results correction) according to the present invention.

Table 4 indicates an example of the recognition results with respect to image data that was read by the scanner 1. These are the results of recognition of the English word "swelling".

TABLE 4

(Example of Recognition Results)

| Input character string (correct) | s | w | e | l | l | i | n | g |
|---|---|---|---|---|---|---|---|---|
| First candidate | s | W | e | l | I | i | n | 9 |
| Second candidate | S | w | C | I | l | | | g |
| Third candidate | 5 | | | j | l | | | q |
| First candidate CT | S 5 | W | | l I | l I | | | |
| Second candidate CT | s 5 | w | | I l | l I | | | 9 |
| Third candidate CT | s S | | | l | I | | | |
| Character image height | 10 | 11 | 10 | 16 | 17 | 16 | 11 | 16 |
| Character image position | 20 | 21 | 19 | 20 | 20 | 19 | 20 | 26 |
| Reliability of recognition results | no | no | no | no | no | yes | yes | no |
| Possibility of mis-recognition | big | big | small | big | big | big | small | big |
| Usability as character string judgment character | yes | yes | no | no | no | yes | yes | yes |
| Stability of height | yes | yes | yes | yes | yes | yes | yes | no |
| Stability of position | yes | yes | yes | yes | yes | yes | yes | no |

In Table 4, "sWe1lin9" (the first candidate) is the recognition result with respect to "swelling". The "character image height" is the difference between the top end position and the bottom end position of the character image (Refer to FIG. 1) or the difference between the top reference line position and the bottom reference line position. The "character image position" is either the coordinate of the bottom end position of the character image (Refer to FIG. 1) or the coordinate of the bottom reference line position. The "Reliability of recognition results", "Possibility of mis-recognition", "Stability of height" and "Stability of position" are used to determined the qualities of the first candidate character as to whether or not it is suitable as a reference character. Each of these qualities respectively correspond to each of the conditions (a), (b), (c) and (d) described earlier. The "Usability as character string judgment character" is the quality that is used to judge whether or not the first candidate character is suitable for use as a reference character in the correction of the recognition result on the basis of the character type. The actual contents of this will be described. The first, second and third candidate CT are those characters (confusion characters) that are easily confused and which are searched from a confusion table.

Embodiment #1

Figure 3:
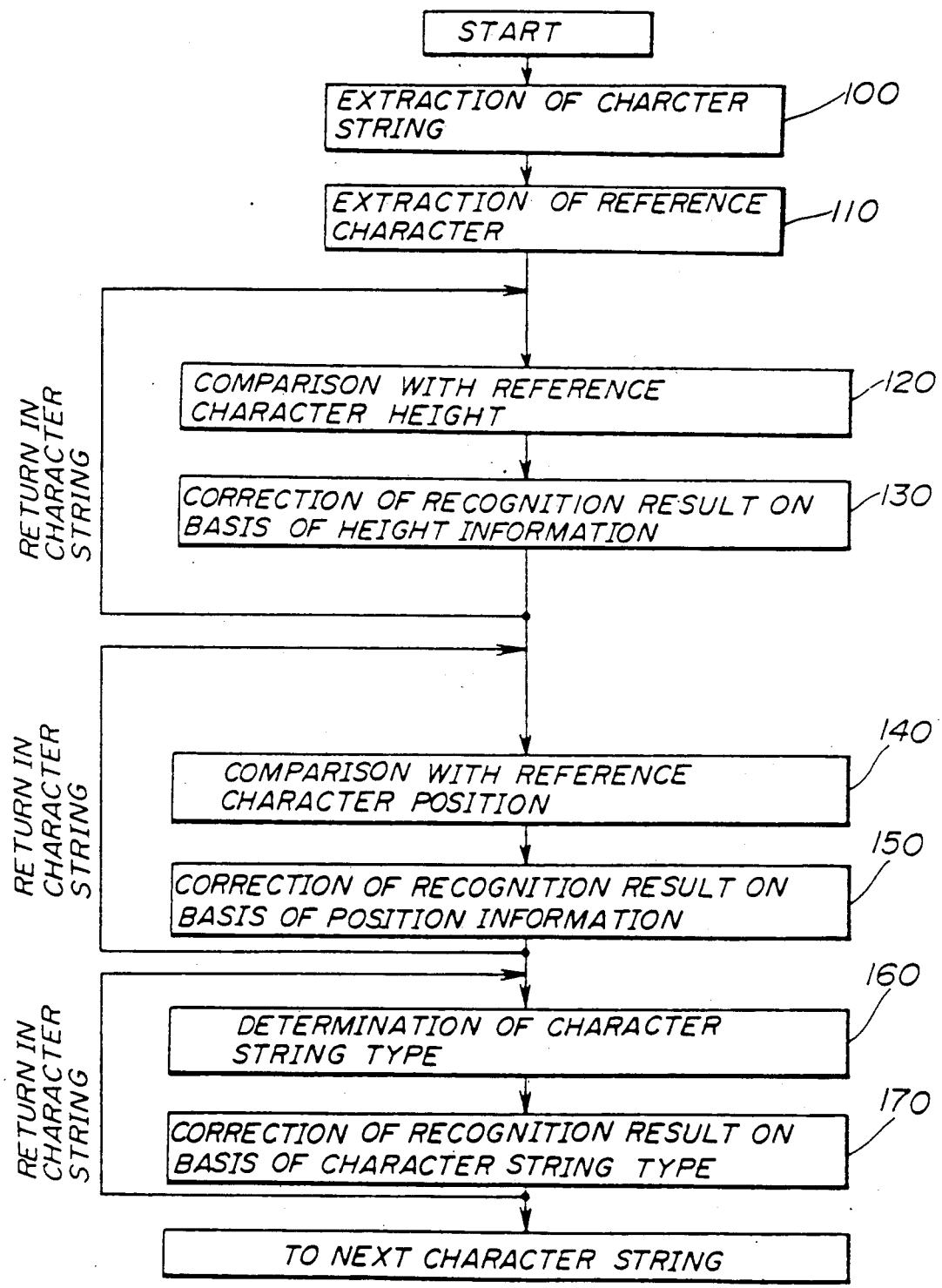
FIG. 3 is a flow chart of processing for describing a first embodiment and a second embodiment of a character recognition post-processing method according to the present invention.

FIG. 3 indicates the recognition post-processing relating to a first embodiment according to the present invention.

First, a character string (such as and English language word) between two spaces, is extracted from the character recognition results (first candidate) (processing step 100). Then, the extracted character string is checked from left to right. Then, the first character that satisfies the conditions for a reference character (processing step 110). The conditions of the reference character are "Possibility of mis-recognition" is small and that there are "Stability of height" and "Stability of position". This is to say, that the conditions are the previously described (b), (c) and (d). In the example shown in Table 4, the third character "e" of the character string is extracted as the reference character.

Then, the height of the character image is used to execute correction processing with respect to each of the characters in the character string and which are not the reference character (processing steps 120 and 130).

In processing step 120, the height of the reference character is used as the reference to judge the attribute of each of the characters. FIG. 4 and FIG. 5 indicate a specific example of the judgment of the attribute according to the height of the character image. These figures indicate the situation where the character "a" has been selected as the first character to have the absolute lower case height in the character string, and as a reference character.

The second character "h" and the third character "p" have heights with large differences with the threshold value and the height (H) is larger than the height "h" of the reference character (i.e. H>h) and so it are judged to belong to (2) of Table 2. The fourth character "o" has a height difference which is smaller than the threshold value and so it is judged to belong to (1) of Table 2. The final (fifth) symbol ",", has a height difference which is greater than the threshold value and also height (H) is smaller than the height "h" of the reference character (i.e. H<h) and so it are judged to belong to (3) of Table 2. FIG. 5 indicates the case where the character "H"  with an absolute upper case height at the head of the character string has been selected as the reference character. In this case, the attributes of the other characters "A" "x" "1" in the character string are judged in accordance with Table 1.

In the example indicated in Table 4, the reference character "e" is the character with the absolute lower case height and so the attribute of the each of the character images is judged in accordance with Table 2. From Table 2, the height of the character image of the reference character "e" is 10. The heights of the other character images are, as indicated in "Character image height" in Table 4, 10(1st), 11(2nd), 16(4th), 17(5th), 16(6th), 11(7th) and 16(8th). If the threshold value is 3 in order to judge for the differences for the heights of the character images, the 1st, 2nd and 7th characters in the character string are judged as belonging to group (1) indicated in Table 2 (i.e. characters for which the height is same as the absolute lower case height) The 4th, 5th, 6th and 8th characters in the character string are judged as belonging to group (2) of Table 2 (i.e. characters for which the height is greater than the absolute lower case height).

In the following processing step 130, the first candidate for each of the characters and the results of the judgment for the attributes as described above, are compared. The first candidate "W: for the 2nd character in the character string is a character that has the absolute upper case character height and so the attribute judgment result contradicts with the attribute of this first candidate character "W". Then the attribute judgment result, that is to say, the character which is in agreement with the "character having the absolute lower case character height" is searched from among the second or lower candidates. As the result of this, the second candidate "w" is found. Then, the first candidate for the 2nd character is replaced with the second candidate. Accordingly, the first candidate character string after correction by the heights of the character images becomes "s, w, 1, I, i, n, 9".

Moreover, a search of the confusion table is made if an appropriate character is not found in processing steps 120 and 130. The confusion characters obtained for each of the candidate characters are handled in the same manner as for the candidate characters (Refer to FIG. Table 4).

Then, correction processing according to the character position is executed for each of the characters in the character string (processing steps 140 and 150).

Figure 6:
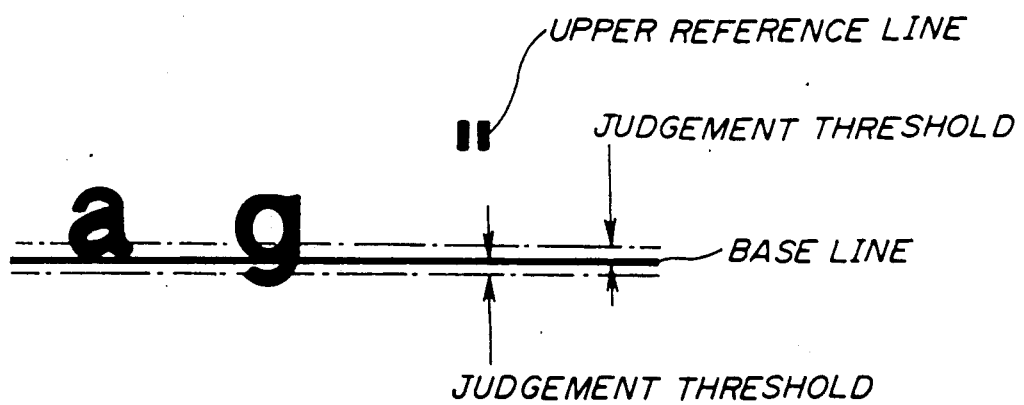
FIG. 6 is a view indicating an example of attribute judgment according to the position of a character image.

First, in processing step 140, the position of the character image in the reference character and the positions of each of the character images are compared. The results of this comparison are used as the basis for judging the attributes according to Table 3. FIG. 6 indicates the case when the head character "a" has been selected as the reference character. The attribute of the 2nd character "g" is (4) in Table 3, and the attribute of the final symbol """ is (6) of Table 3. In the example of Table 4, the position of the character image of the reference character "e" is 19. As is indicated in Table 4, the positions of the other character images are 20(1st), 21(2nd), 20(4th), 20(5th), 19(6th), 20(7th) and 26(8th). If the threshold judgment is 3, then the 8th character in the character string is judged to belong to group (4) of Table 3. The remaining characters (with the exception of the reference character) are judged to belong to group (5) of Table 3.

Then, in processing step 150, the first candidate (after correction according to the character image height) for each of the characters and the results of the judgement for the attribute as described above are compared. The first candidate "g" for the 8th character is a character for which the position is equal to the position of the reference character image and so the results of the attribute judgment results contradict the attribute of the first candidate character "9". A search of the candidates is then conducted for the character that agrees with the attribute judgment results. As a result of this, there is the second candidate character "g" and so this is replaced as the first candidate character. Accordingly, the first candidate character string after correction becomes as follows.

[s, w, 1, I, i, n, g]

Moreover, in the processing steps 140 and 150, when an appropriate character cannot be found from among the candidates, a search of the confusion table is made for an appropriate character.

Then, the type of character string is presumed and then the recognition results are corrected (processing steps 160 and 170).

First, in processing step 160, a search is made for a character for which there is "yes" for the "character with usability as a character string judgment character" item indicated in Table 4 from the first candidate character string (the corrected result so far). This character string judgment character is a character that forms the standard for presuming the type of character string. The condition for this is that the character not be a character which is easily mis-recognized (such as the numeral 1 and the lower case l, or the upper case letter S and the numeral 5, and similar combinations), and that it be a character of another type. In this example, s, w, i, n, g from the first candidate character string are selected as character judgment characters. The selected character judgment characters are all lower case characters and so in accordance with Table 5, it is presumed that the type of character string is a English language lower case character string.

TABLE 5

(Example of type of character string and combinations of type of character string judgment characters)

| Type of character string judgment character within character string | | | | Type of character string presumed |
|---|---|---|---|---|
| lower case | upper case | numerics | symbols | |
| yes | yes | no | no | English |
| yes | no | no | no | English lower case |
| yes | no | no | yes | English lower case |
| no | yes | no | no | English upper case |
| no | yes | no | yes | English upper case |
| no | no | yes | no | Numerics |
| no | no | yes | yes | Numerics |
| no | no | no | yes | Symbols |
| no | yes | yes | no | Other |
| — | — | — | — | — |

In the following processing step 170, the presumed type of character string is compared with the first candidate and characters that are not in agreement have a type that is applicable searched from the second and lower candidates. If a suitable character cannot be found in the candidates, then a search of the confusion table is conducted and if this search finds a character then that character is replaced with the first candidate.

In this example, the 1 which is the 4th character is of a type different from that which was presumed. The I which is the second candidate is also inappropriate. The j which is the third candidate is a lower case letter but the lower end position of the character image is not compatible with the position of the 4th character image which is indicated in Table 4. Here, a search of the confusion table is performed and the lower case l is found. This is suitable and so this lower case l is substituted with the first candidate. The final first candidate character string has all lower case characters and is swelling and this is output as the result.

Moreover, the accuracy of the presumption as to the character string type is improved if a check according to the position and the height of the character image is performed beforehand. The following is an explanation of this, for the example indicated in Table 6.

TABLE 6

| Input character string (correct) | g | l | o | s | s |
|---|---|---|---|---|---|
| First candidate character string | 9 | 1 | O | S | 5 |
| Second candidate character string | g | I | o | s | s |
| Third candidate character string | | 1 | 0 | 5 | S |
| First candidate character string after correction according to height and position of character image | g | 1 | o | s | s |

First of all, the case where the processing prior to the correction according to the height and the position of the character image is performed on the presumption of the type of character string will be considered. in this case, it is not possible to select all of the character string judgment characters by the first candidate. This is to say that there are many instances where the "9" and the "g" are mis-recognized. The 1 and the l and the I are also mis-recognized in many cases. Also, the O and the 0 and the o are also mis-recognized in many cases. The S and the s and the 5 are also mis-recognized in many cases, as is the s with the S and the 5. In all of these cases, the conditions for a character string judgment character are not satisfied. Accordingly, it is not possible to presume the type of character string and so correction according to the character string type cannot proceed effectively.

On the other hand, after the correction processing by the height and the position of the character image, the "g" in the first candidate character string after processing becomes the character string judgment character (since the possibility of it being mis-recognized is less because of the processing by the position of the character image). The 1 does not become the character string judgment character (because it is difficult to distinguish the 1 from the upper case character I even after processing using the height and position of the character image has been performed). The o becomes a character string judgment character (in the same way as the g) and the s becomes a character string judgment character (in the same way as the g). Accordingly, the character string is presumed to be an English language lower case character string. As the result of this, the numeral 1 in the first candidate character string is corrected to a lower case l and the correct result is obtained.

Moreover, for each of the characters, correction according to the height and correction according to the position can be performed continuously.

Embodiment #2

The flow of the processing is the same as that indicated in FIG. 3.

In this embodiment, in processing step 110, the first character that satisfies all of the reference character conditions (a), (b), (c) and (d) is extracted as the reference character. In the example indicated in Table 4, the 7th character "n" in the character string is extracted as the reference character. The manner other than this are the same as for the first embodiment.

Embodiment #3

Figure 7:
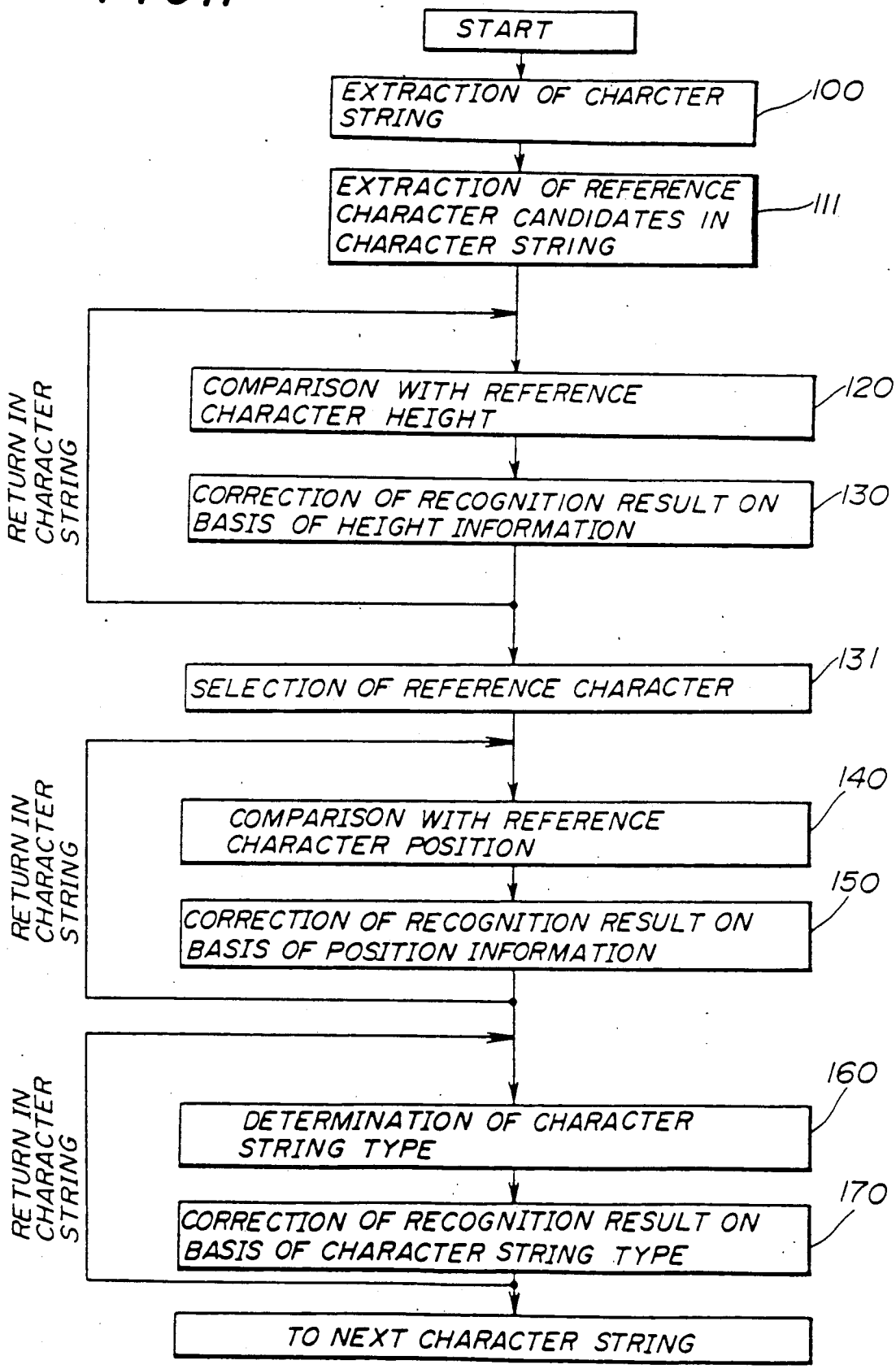
FIG. 7 is a flow chart indicating the processing for describing a third embodiment of a character recognition post-processing method according to the present invention.

The flow of the processing is indicated in FIG. 7. In FIG. 7, the steps that are the same as those in FIG. 3 are indicated with the same numerals.

In processing step 111, all of the characters that satisfy the conditions for the reference character are extracted as reference character candidates from the character string. In this manner, all of the reference character candidates are extracted and so this processing in processing step 111 differs from the processing (processing step 110 of FIG. 3) corresponding to the first embodiment and the second embodiment.

In this manner, the reference character candidates are extracted and so in processing steps 120 and 130, each of the reference character candidates are used as reference characters respectively so that the results of the recognition of the other characters are corrected. The recognition results are corrected on the basis of the height of the character image.

Processing step 131 is additional processing. here, each of the reference character candidates are used to compare the corrected first candidate character string and the humming distance with the first candidate character string prior to correction. Then, the reference character candidate that produces the least humming is selected as the reference character that has the highest probability. The first candidate characters which are corrected on the basis of this selected reference character are valid.

For example, in the case of the character string indicated in Table 4, for when the conditions for the reference character are determined as satisfying all of the previously described conditions (a), (b), (c) and (d), the only reference character candidate that satisfies these conditions is the 7th character "n". In this case, there is no comparison of the above described humming distance and this character "n" is the only reference character that is determined.

In the above manner, the reference character is determined and the height of that reference character is made the reference and the recognition results for each of the characters are corrected, and then the processing is performed from processing step 140 through to processing step 170.

The processing from processing step 140 through to processing step 170 is the same as the corresponding processing in the first embodiment.

The following will be a description of an example indicating the humming distance, with reference to Table 7.

TABLE 7

(Example of reference character selection by humming distance)

| Input character string Recognition results | " | l | o | c | u | t | o | r | " |
|---|---|---|---|---|---|---|---|---|---|
| 1st candidate | | n | 1 | o | C | u | t | O | r |
| 2nd candidate | " | 1 | O | c | U | o | | | |
| 3rd candidate | | | I | 0 | | V | | Q | |
| Correction results when n is the | | n | 1 | O | C | U | t | O | Δ Δ |
| | | | | ↑ | ↑ | | | ↑ | ↑ |

TABLE 7-continued (Example of reference character selection by humming distance)

| reference character Correction results when r is the reference character | " | l | o | c | u | t | o | r | " |
|---|---|---|---|---|---|---|---|---|---|
| | | | | | ↑ | | | ↑ | |

In this table, the ↑ symbol for each of the correction results indicates that the character is a character which is not in agreement with the first candidate character prior to correction. Of the results corrected with the 1st character "n" as the reference character, there are four characters that are no in agreement with the first candidate prior to correction. This is to say that the humming distance is 4 when "n" is selected as the reference character. Of the results corrected with the 8th character "r" as the reference character, there are two characters that are no in agreement with the first candidate prior to correction. This is to say that the humming distance is 2 when "r" is selected as the reference character. Accordingly, the 8th character "r" for which the humming distance is small is selected as the reference character. The Δ symbol in Table 7 indicates that a character which could be replaced was unable to be found. This is excluded from the evaluation of the reference character selection.

This selection method for the reference character candidate is effective when two or more reference character candidates having the absolute upper case character height have been extracted or when two or more reference character candidates having the absolute lower case character height have been extracted.

Moreover, the processing for the reference character selection (processing step 131) is possible after the correction processing according to the character image.

Embodiment #4

Figure 8:
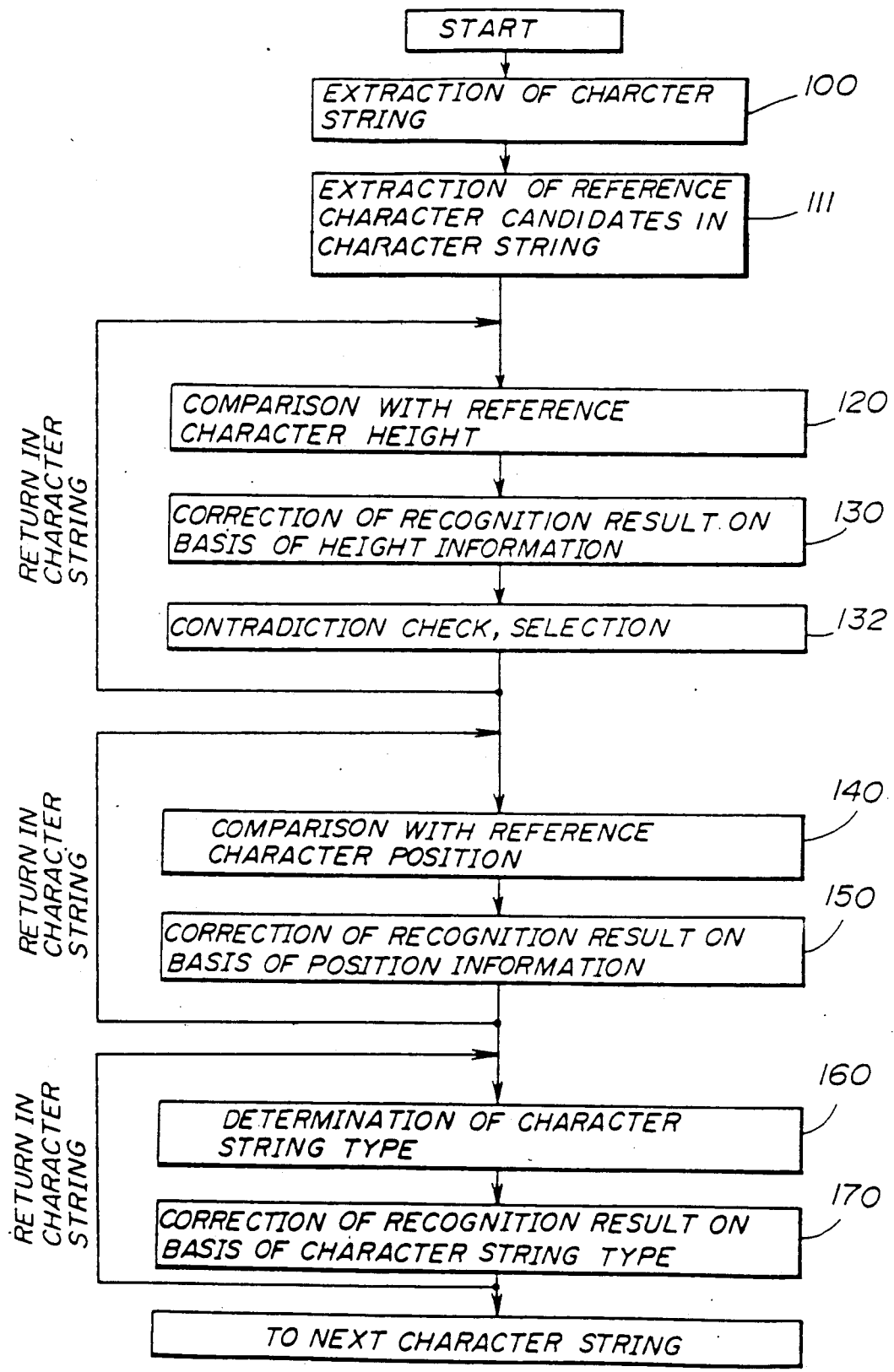
FIG. 8 is a flow chart indicating the processing for describing a fourth embodiment of a character recognition post-processing method according to the present invention.

The flow of the processing is indicated in FIG. 8.

In FIG. 8, the processing steps that are the same as that indicated in FIG. 3 and FIG. 7 is indicated with the same numerals.

In processing step 111, if a plural number of characters that satisfy the reference character conditions are found, then in the same manner as for embodiment #3, those characters will be extracted as reference character candidates. The selection of the final reference character is performed in the extra processing step 132 which is added inside the processing loop (the loop of the processing steps 120 and 130) for the correction by the character image height.

In processing step 120 and 130, correction according to the height of the character image is successively performed for each of the characters in the character string using each of the reference character candidates. When the correction results for each of the characters have been obtained, a check is performed in processing step 132 for whether there are any contradictions. For example, if for the same character, the height is judged as high when the reference character candidate with the absolute reference upper case character height is used as the reference, and conversely, the height is judged as low when the reference character candidate with the absolute lower case reference character height is used as the reference, then this is an obvious contradiction. If such contradictions occur, then at that point, the reference character candidate with the lower level of reliability is excluded. However, correction results using a reference character candidate that has not been selected are also valid, then those correction results are used for correction according to the character image position.

This selection method for the reference character candidate is effective in cases when the reference character candidate has been extracted with the absolute upper case character height and the reference character candidate with the absolute lower case character height have been extracted. The other processing is the same as that for the third embodiment.

Embodiment #5

Figure 9:
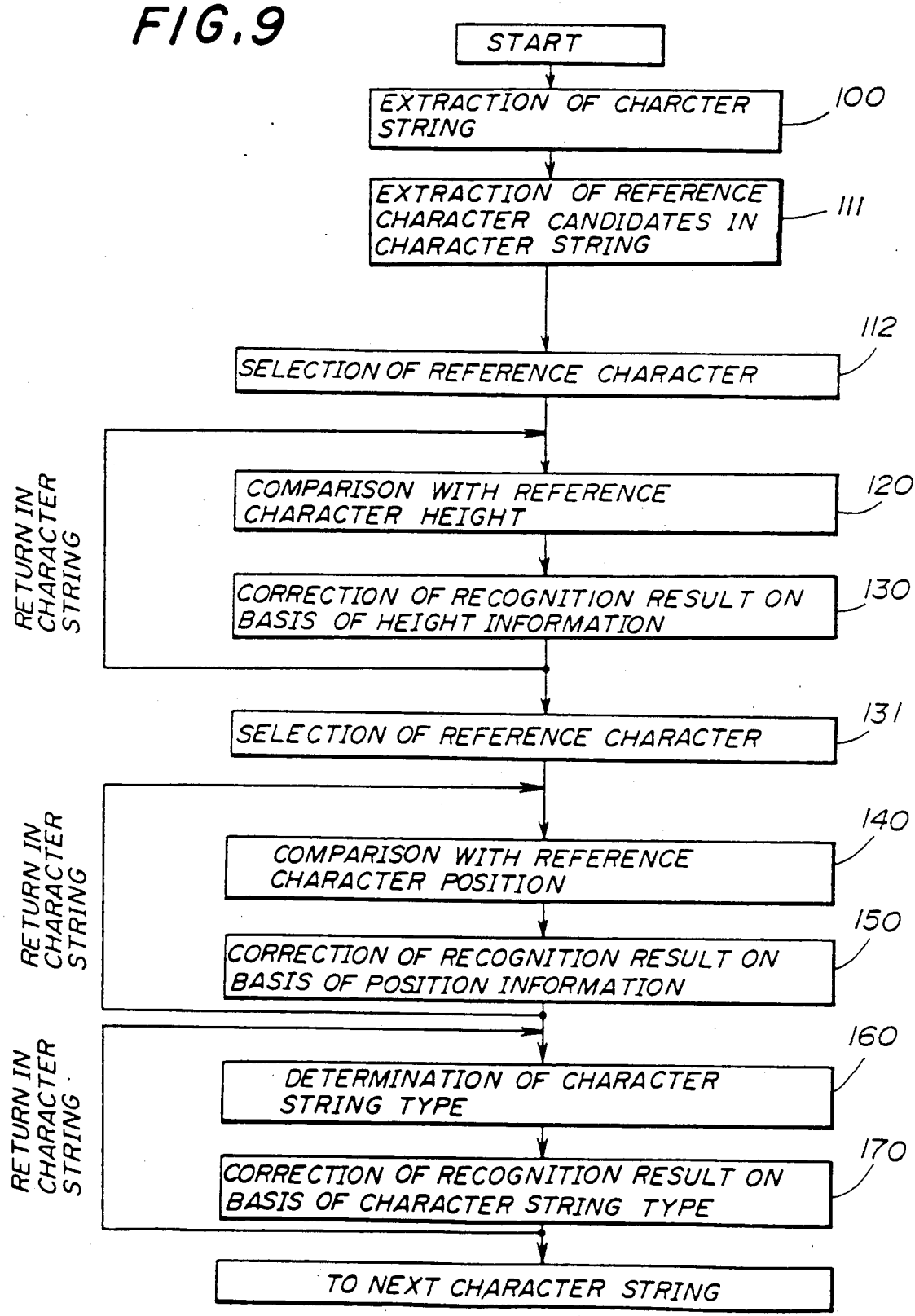
FIG. 9 is a flow chart indicating the processing for describing a fifth embodiment of a character recognition post-processing method according to the present invention.

The flow of the processing is indicated in FIG. 9.

In FIG. 9, the processing steps that are the same as that indicated in FIG. 3 and FIG. 7 is indicated with the same numerals.

In this embodiment, the addition of the processing step 112 makes it different from the embodiment #3 of FIG. 7. In processing step 112, the extracted reference character candidate has its reliability compared according to the previously described evaluation function, for example. When a meaningful difference that has been previously set has been recognized, the reference character candidates are excluded in the order of low reliability and limited reference character candidates are selected. By this selection of the reference character candidates, the load of the post-processing is reduced considerably. The selection of the final reference character candidate is performed by the processing step 131.

Embodiment #6

Figure 10:
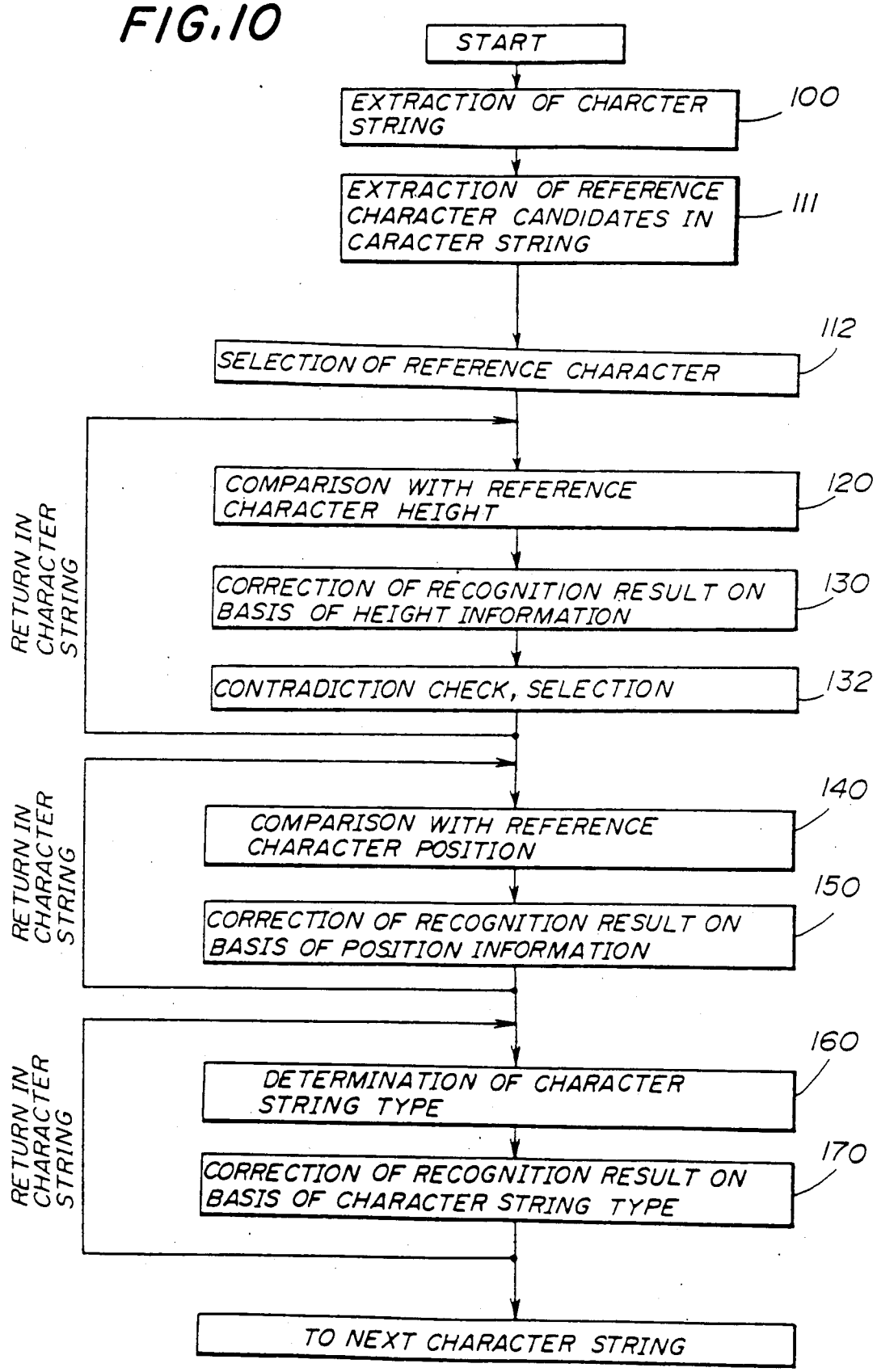
FIG. 10 is a flow chart indicating the processing for describing a sixth embodiment of a character recognition post-processing method according to the present invention.

The flow of the processing is indicated in FIG. 10.

In FIG. 10, the processing steps that are the same as that indicated in FIG. 3 and FIG. 8 are indicated with the same numerals.

In this processing, there is the addition of processing step 112 which makes it different from the processing in FIG. 8 for the fourth embodiment. The content of the processing step 112 is as described for the fifth embodiment, above.

Embodiment #7

Figure 11:
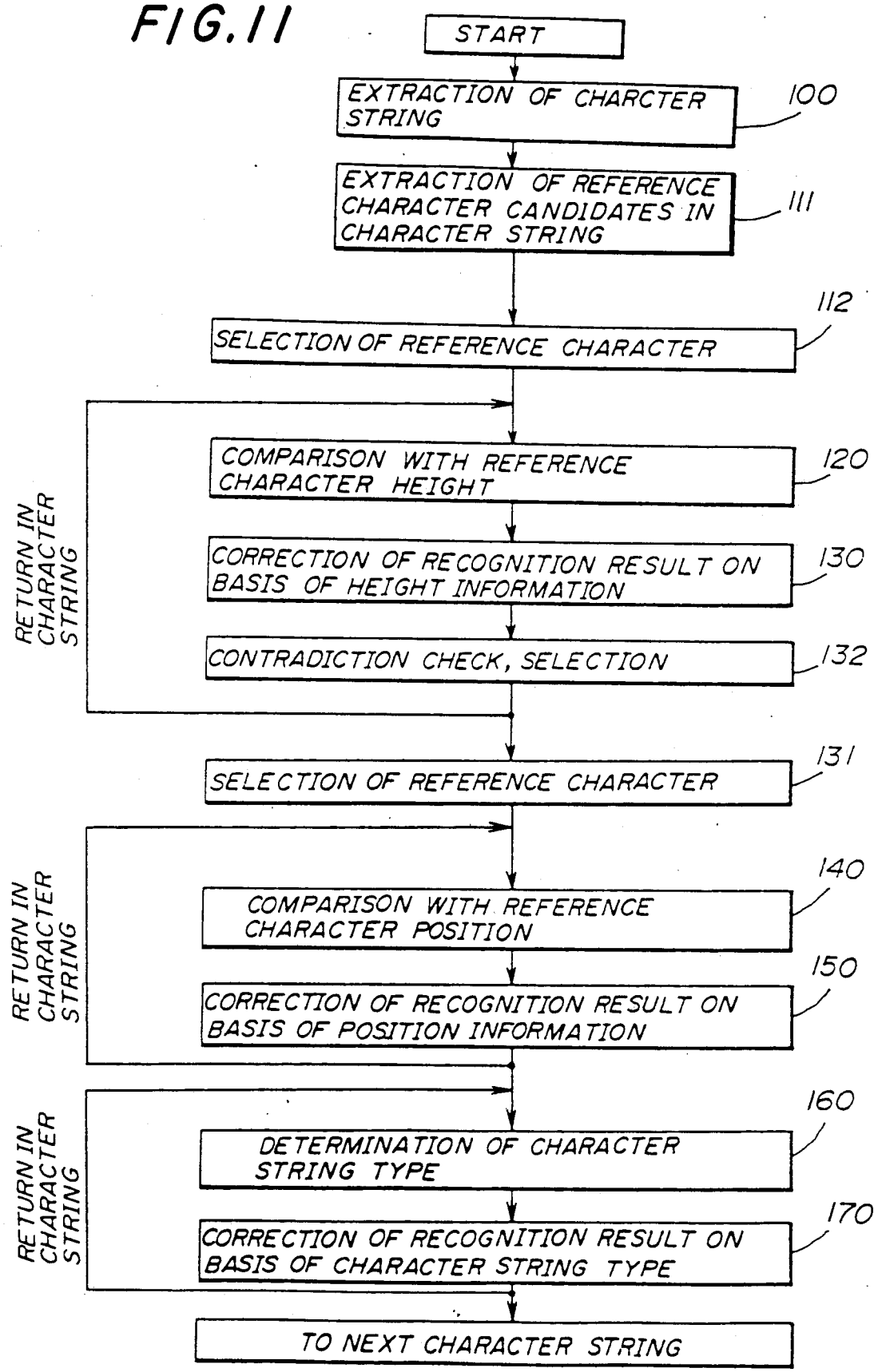
FIG. 11 is a flow chart indicating the processing for describing a seventh embodiment of a character recognition post-processing method according to the present invention.

The flow of the processing is indicated in FIG. 11.

In FIG. 11, the processing steps that are the same as that indicated in FIG. 3 and FIG. 7 through FIG. 10, are indicated with the same numerals.

This seventh embodiment is a combination of the fifth embodiment indicated in FIG. 9 and the sixth embodiment indicated in FIG. 10. In processing step 112, the limited reference character candidates are selected. Then, in processing step 132, contradictions in the correction results are used as the basis for the further determination of the reference character candidate. In processing step 131, the final selection is made for the reference character.

Moreover, the processing step 131 can also be performed after the processing according to the position of the character image.

Embodiment #8

Figure 12:
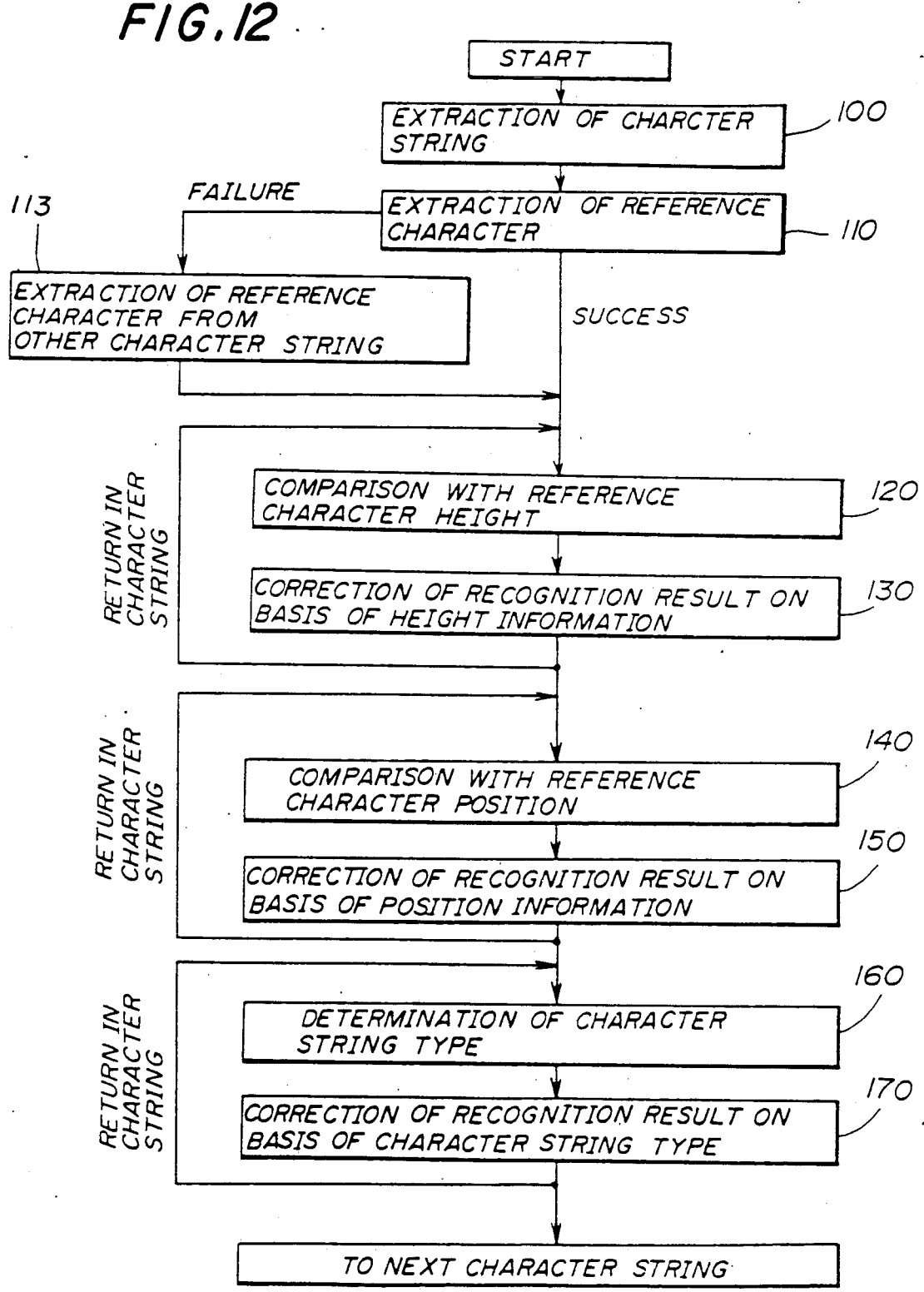
FIG. 12 is a flow chart indicating the processing for describing a eighth embodiment of a character recognition post-processing method according to the present invention.

The flow of the processing is indicated in FIG. 12.

In FIG. 12, the processing steps that are the same as that indicated in FIG. 3 are indicated with the same numerals.

In this embodiment, there is the additional processing step 113 to the processing indicated in FIG. 3. In processing step 110, one reference character is searched from the character string that is the object of processing. When a reference character cannot be found, processing step 113 is used to search for a reference character under the same conditions and from the other character string. Other than this, the processing is the same as for the first embodiment.

Embodiment #9

Figure 13:
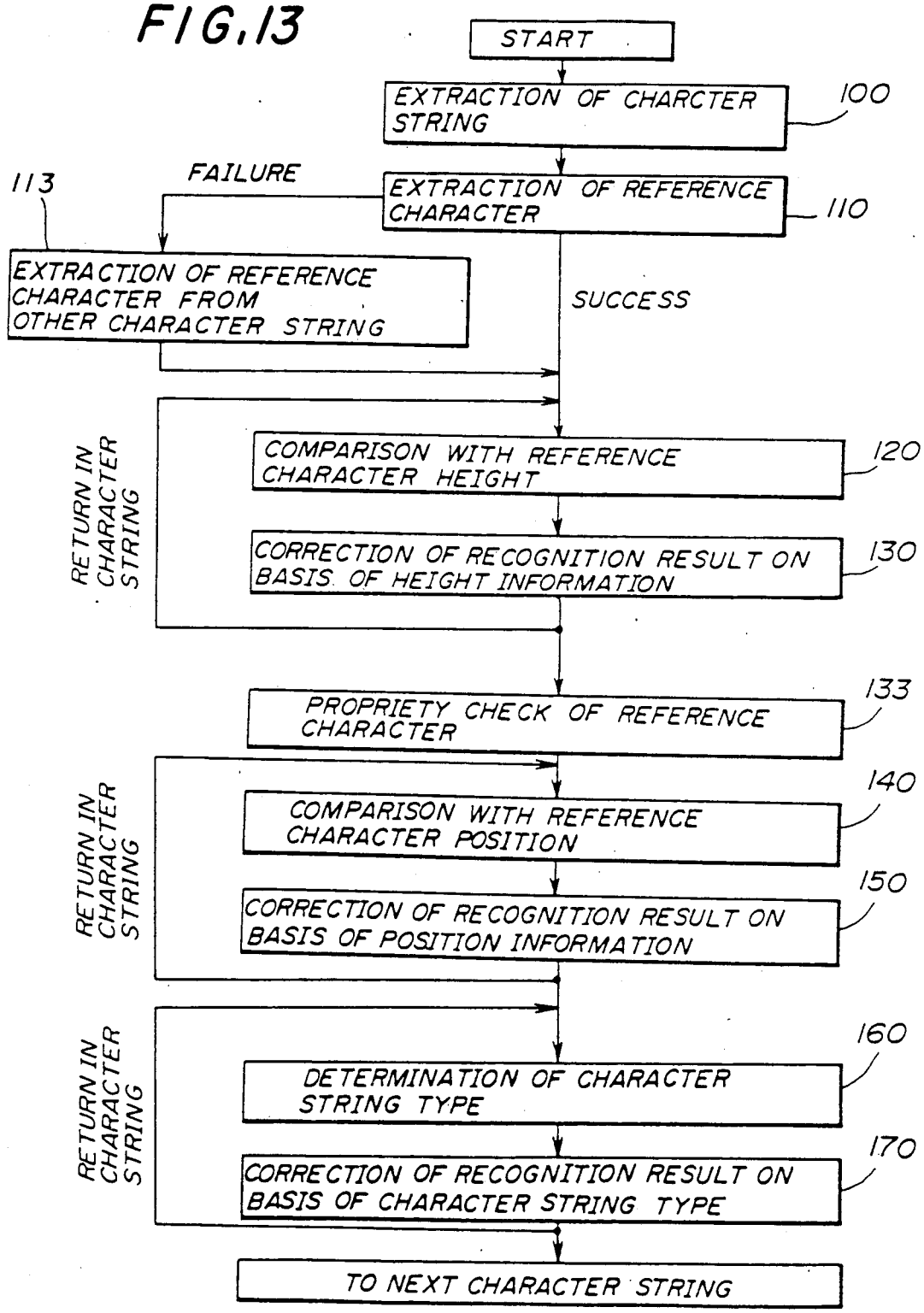
FIG. 13 is a flow chart indicating the processing for describing a ninth embodiment of a character recognition post-processing method according to the present invention.

The flow of the processing is indicated in FIG. 13.

In FIG. 13, the processing steps that are the same as that indicated in FIG. 12 are indicated with the same numerals.

In this embodiment, there is the additional processing step 133 after the correction by the height of the character image and this makes this embodiment different from the eighth embodiment. When a reference character of another character string is used, it is necessary to avoid the use of a reference character of another character string that has a different font size, as has been described earlier. Accordingly, in processing step 133, a check is performed as to whether or not the reference character extracted from another character string is appropriate. If it is judged to be inappropriate, then the results of this reference character will be invalid.

Table 8 indicates the case where a reference character from another character string has been used. The following is a description of the example in Table 8.

TABLE 8

|  | Previous character string | | | Processing character string | | |
| --- | --- | --- | --- | --- | --- | --- |
| Input character string Recognition results | f | o | r | y | o | u |
| 1st candidate | f | O | r | Y | o | u |
| 2nd candidate | t | 0 | n | y | 0 | U |
| 3rd candidate |  | o |  | v | o | v |
| Correction result using r as the reference character |  |  |  | y ↑ | o | u |

There is no character suitable as the reference character for the processing character string (you). The third character r which satisfies the conditions for a reference character in the previous character string (for) is used as the reference character for the processing character string (you). In processing step 133, the correction results according to the character image height and using this reference character, and the humming distance with the first character, and the humming distance with the first character candidate are checked. Then, if the humming distance is less than one half of the number of characters in the processing character string, that reference character is judged to be suitable. In this example, the humming distance is 1 and so the reference character r is judged to be suitable.

Embodiment #10

Figure 14:
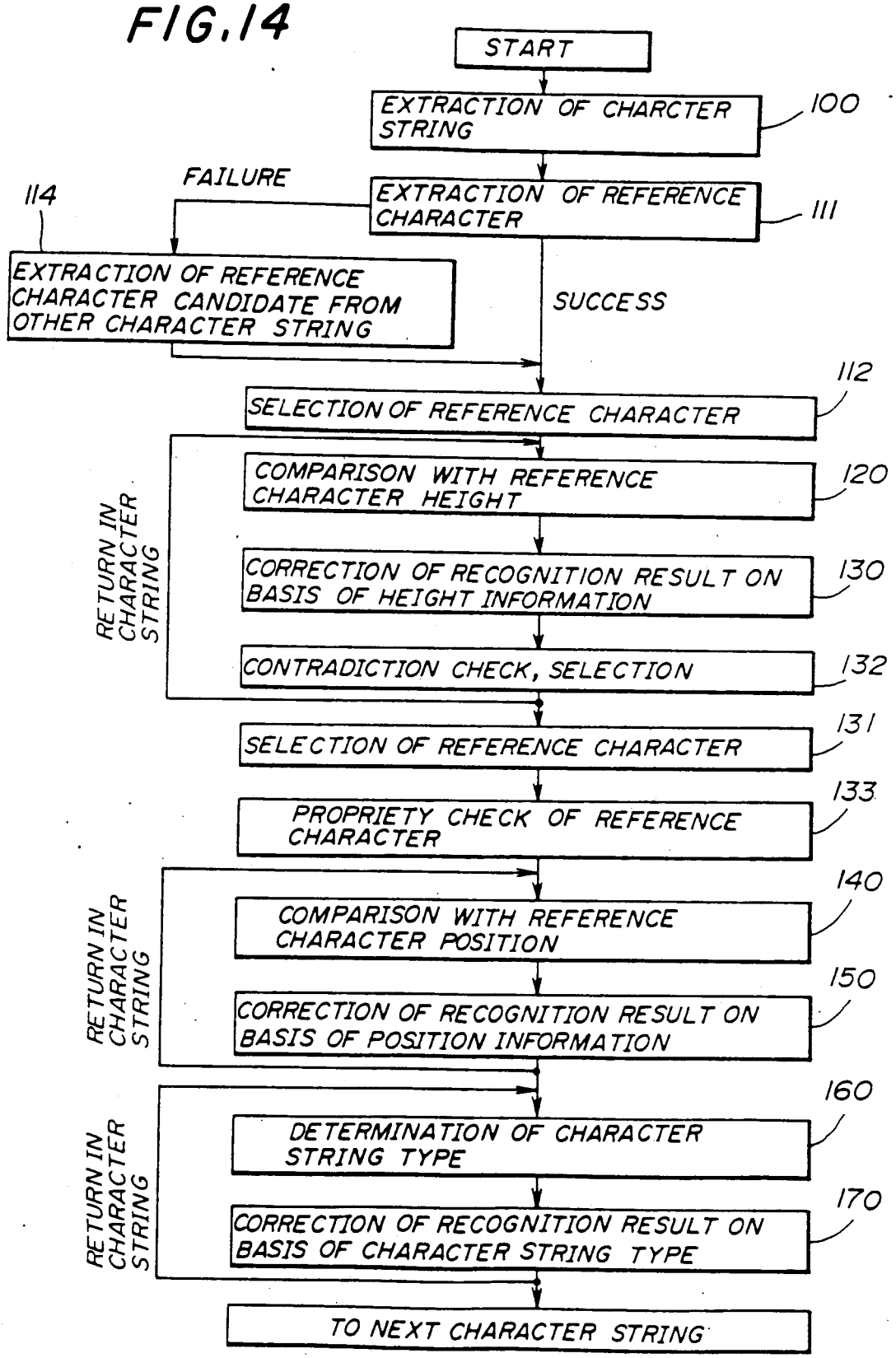
FIG. 14 is a flow chart indicating the processing for describing a tenth embodiment of a character recognition post-processing method according to the present invention.

The flow of the processing is indicated in FIG. 14.

In FIG. 14, the processing steps that are the same as that indicated in FIG. 3 and FIG. 11 through FIG. 13 are indicated with the same numerals.

In processing step 111, the extraction of the reference character candidate from the processing character string is performed. If a suitable reference character candidate is not extracted, then in processing step 114, the extraction of a similar reference character candidate is performed for from another character string. The selection of the reference character is performed in processing steps 112, 131 and 132 in the same manner as for the seventh embodiment (of FIG. 11). In addition, in the same manner as for the ninth embodiment (FIG. 13), a check is performed in processing step 133 for the reference character candidate extracted from another character string.

Moreover, it is possible to vary the setting for the threshold value for the attribute judgment in accordance with the height of the reference character image. All of the characters that satisfy the conditions are extracted as reference character candidates from either the processing character string or another character string. Then, it is also possible to vary the setting for the threshold value for the attribute judgment in accordance with the height of the reference character image, for the case when correction according to the height of the character image and using the respective characters as the reference characters is performed.

The following will be a description of the eleventh embodiment using the recognition results indicated in Table 9 as an example.

TABLE 9

(Example of recognition results)

| | | | | | | | | |
|---|---|---|---|---|---|---|---|---|
| Input character string (correct) | ! | i | b | — | 2 | 4 | 6 | , |
| First candidate | ! | ! | b | — | 2 | 4 | s | , |
| Second candidate | 1 | | | | | | 6 | , |
| Third candidate | | | | | | | | |
| First candidate CT | | i | | | | | S | , |
| Second candidate CT | | | | | | | | |
| Third candidate CT | | | | | | | | |
| Character image height | 17 | 16 | 17 | 5 | 17 | 16 | 17 | 5 |
| Character image position | 20 | 21 | 21 | 16 | 20 | 20 | 21 | 20 |
| Reliability of recognition results | no | no | yes | yes | yes | no | no | no |
| Possibility of mis-recognition | bit | bit | small | big | big | small | small | big |
| Usability as character string judgment character | no | no | yes | yes | no | yes | yes | no |
| Stability of height | yes | yes | yes | no | yes | yes | yes | no |
| Stability of position | yes | yes | yes | no | yes | yes | yes | yes |

Embodiment #11

Figure 15:
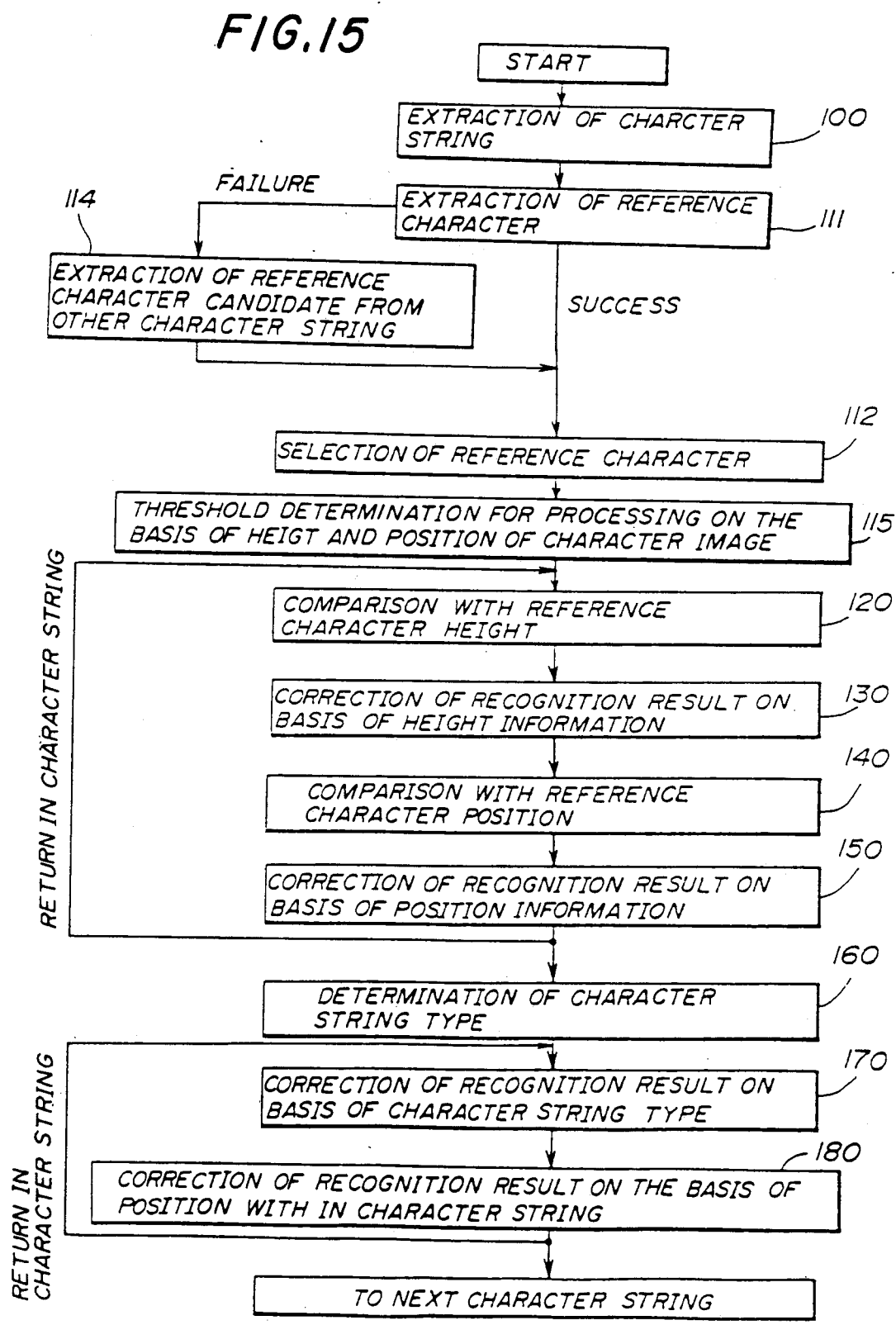
FIG. 15 is a flow chart indicating the processing for describing a eleventh embodiment of a character recognition post-processing method according to the present invention.

The flow of the processing is indicated in FIG. 15.

In FIG. 15, the processing steps that are the same as that indicated in FIG. 3 and FIG. 9 are indicated with the same numerals.

In this embodiment, the correction according to the height and position of the character image is performed in the same manner as in the embodiments described so far (in processing steps 120, 130, 140 and 150). After this, correction is performed according to the type of character string (processing steps 160 and 170). Then, after the correction according to the type of character string, the appropriateness of the position of the character in the character string is used to perform an additional correction (processing step 180). In this embodiment, in the character string, information for the position (head of the character string, tail of the character string, etc.) where the character can exist is used and so it is possible to perform correction of the recognition results even in cases where a different character type is in the character string.

In processing step 112, the characters in which the height and the minimum coordinate (position) are stable and have the reliability of the recognition results are selected. Then, the most appropriate character from the selected character group is selected as the reference character. In the example shown in Table 9, the only character that satisfies the above conditions is the character "b" and so "b" becomes the reference character. After the reference character has been determined, the height of the image of the said reference character is used as the basis for using the character height and the position to determine the through-hold in the processing (processing step 115).

Then, processing that uses the height of the character image is performed (processing step 120, 130). In the example shown in Table 9, the reference character "b" is the character that has a high character height (absolute upper case character height) and so the judgment for the respective characters is performed as follows on the basis of the heights of the character images. The height of the reference character "b" is 17. If the through-hold is 3, then the character images that have the absolute upper case height are !(17), !(16), 2(17), 4(16) and s(17). The character images that are lower than the height of the absolute upper case character height are —(5), and ,(5).

The candidate characters are searched on the basis of the results of this judgment. "s" was a character that did not have the absolute upper case character height and so the judgment results with respect to "s" are not suitable. "6" is a suitable character from among the candidate characters. Accordingly, the first candidate character string after the post-processing according to the height of the character images is !!b—246, .

Then, processing according to the position of the character image is performed (processing steps 140 and 150). The lowest coordinate of the reference character "b" is 21. In the same manner as the case for the processing according to the height, if the through-hold is 3, then the lowest coordinate is equal and nearly equal to the lowest coordinate of the reference character for !(20), !(21), 2(20), 4(20), 6(21), and ,(20). The lowest coordinate is higher than the lowest coordinate of the reference character for —(26).

This judgment is used as the basis for the performance of a search of the candidate characters. "," is a character which is normally lower than the lowest coordinate of the reference character and so is not suitable. "." is a suitable character from among the candidate characters. Accordingly, the first candidate character string after the post-processing according to the character image becomes [!!b—246.].

Then, processing to determine the type of character string is performed (processing step 160). In the case of the example in Table 9, the character string judgment characters are [b, —, 4, 6] and so the type of character string cannot be determined (since there is a combination of symbols, numerals and alphabetic characters). Accordingly, correction according to the type of character string is no performed.

Finally, correction according to the position of the character string is performed (processing step 180). For each of the respective characters are stored the positions where that character can exist in a character string. The character string indicated in Table 9 has this information stored in the manner shown in Table 10.

TABLE 10

|   | Head of character string | Middle of character string | Tail of character string |
|---|---|---|---|
| ! |   |   | o |
| b | o | o | o |
| — |   | o |   |
| 2 | o | o | o |
| 4 | o | o | o |
| 6 | o | o | o |
| 1 | o | o | o |
| i | o | o | o |

In Table 10, the middle of the character string is that portion other than the head or the tail of the character string. In addition, those places marked with an "o" indicate that it is possible for each character in the character string to exist. This information is used as the basis for the following correction processing for the recognition results. "!" is a character that cannot exist at the head of a character string and so is not suitable. "1" is a character that is suitable as a candidate character. In the same manner, "!" is a character that cannot exist in the middle of a character string and so the judgment result for the 2nd "!" is also not suitable. In the same manner, the character"i" is selected as a suitable candidate character. Accordingly, the results of the post-processing according to the position within the character string become [lib—246.].

In the flow indicated in FIG. 15, the correction according to the position within the character string is performed after the correction according to the type of character but either can be performed first.

The following will use the example of the recognition results indicated in Table 11 to describe embodiments 12 through 14 relating the correction of the information for the reference position.

TABLE 11

| (Example of recognition results) | | | | | | | | |
|---|---|---|---|---|---|---|---|---|
| Input character string (correct) | p | r | o | p | o | s | a | 1 |
| First candidate | p | r | O | P | o | S | a | 1 |
| Second candidate | P |   | o | p | O | s |   |   |
| Third candidate |   |   |   |   |   |   |   |   |
| Character image height | 22 | 11 | 10 | 21 | 10 | 10 | 11 | 20 |
| Character image position | 4 | 10 | 12 | 6 | 14 | 14 | 16 | 15 |
| Reliability of recognition results | no | yes | no | yes | no | no | no | no |
| Possibility of mis-recognition | big | small | big | small | big. | big | small | big |
| Stability of height | yes | yes | yes | yes | yes | yes | yes | yes |
| Stability of position | no | yes | yes | no | yes | yes | yes | yes |

Embodiment #12

Figure 16:
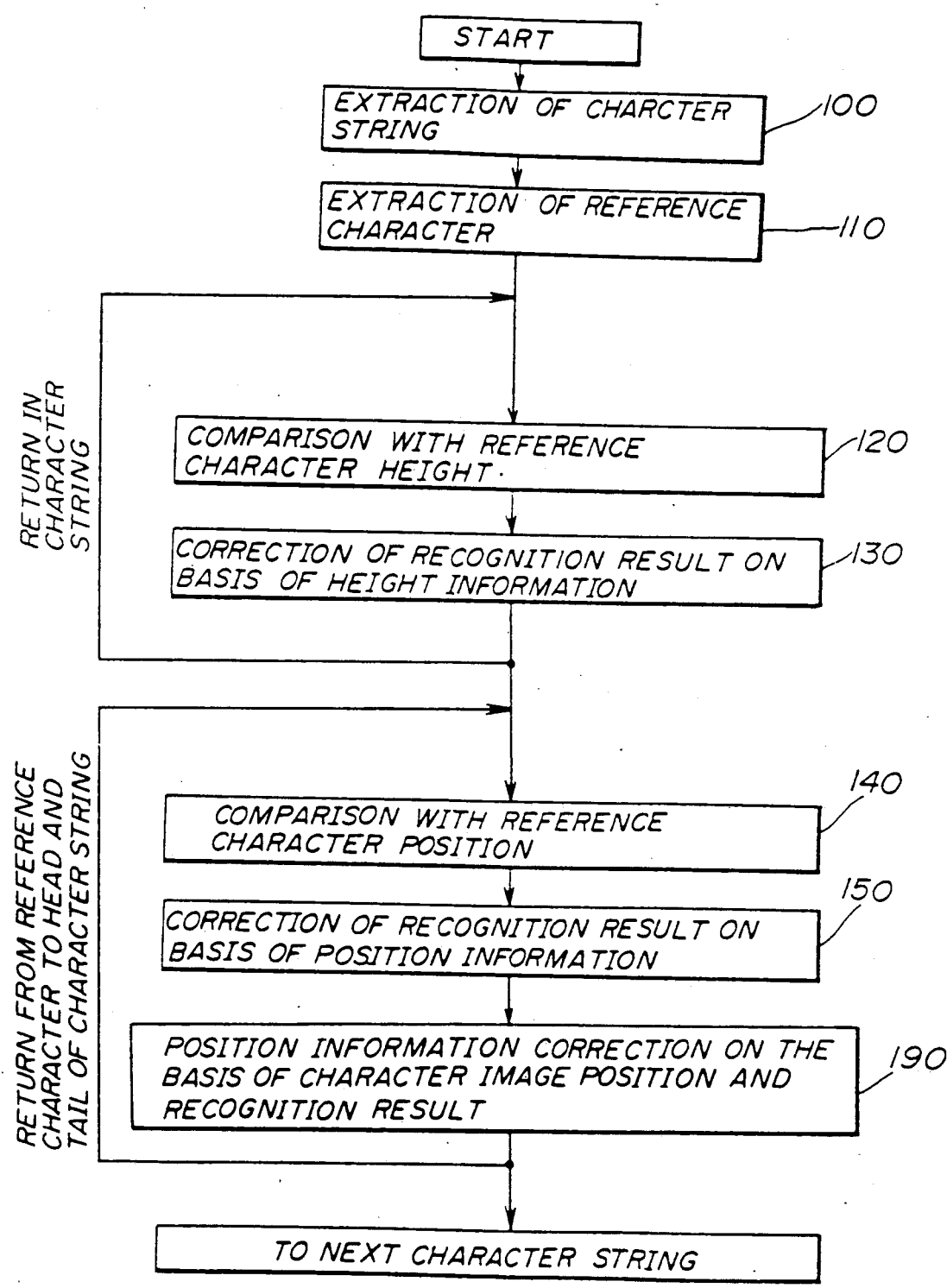
FIG. 16 is a flow chart indicating the processing for describing a twelfth and thirteenth embodiment of a character recognition post-processing method according to the present invention.

The flow of the processing is indicated in FIG. 16.

In FIG. 16, the processing steps that are the same as that indicated in FIG. 3 are indicated with the same numerals.

In this embodiment, the correction processing step 190 for the position information is added instead of the processing steps 160 and 170 for the character string.

First of all, the character string between two spaces is extracted from the character recognition results (processing step 100). Then, the extracted character string is checked from the left to the right. The first character that satisfies the conditions (a), (b), (c) and (d) as the conditions for the reference character as have been previously described, is extracted as the reference character (processing step 110). In the example in Table 11, the second character "r" of the character string is extracted as the reference character.

Then, correction processing using the height of the character image is performed with respect to each of the characters other than the reference character, within the character string (processing step 120, 130).

In processing step 120, attribute judgment is performed for each of the characters using the height of the reference character as the reference height. The reference character "r" is a character with the absolute lower case character height and so this judgment is an attribute judgment in accordance with Table 2. The height of the character image of the reference character "r" is 11 from Table 11. The heights of the character images of each of the other characters is indicated in the item for "character image height" in Table 11. If the judgment threshold for the difference in the height of the character image is 3, then the 3rd, 5th, 6th and 7th characters in the character string belong to group (1) of Table 2 (i.e. characters having the height of the absolute lower case character). In addition, the 1st, 4th and 8th characters in the character string are judged as belonging to group (2) of Table 2 (i.e. characters higher than the absolute lower case character).

In the following processing step 130, a comparison is performed for the first candidates for each character and the results of the attribute judgment according to the height. The first candidate "p" for the 1st character in the character string is a character with the height of the absolute lower case character. This contradicts the attribute judgment results. Here, the attribute judgment results, that is to say, the search for a second or lower candidate for the "character with the absolute upper case height" gives the second candidate "P". Accordingly, the first candidate for the 1st character and the second candidate are swapped. The same holds for the 3rd and the 6th characters. The "o" and the "s" for the second candidate also replace their respective first candidates. The same also replace their respective first candidates. The same also occurs for the 8th character but there is neither a second candidate nor a third candidate and so there is no replacement. Accordingly, the first candidate character string after correction according to the height of the character image becomes [P, r, o, P, o, s, a, 1].

Moreover, in processing steps 120 and 130, when there is no appropriate character among the candidates, a search of the confusion table can be performed to search for an appropriate character.

Then, an attribute judgment (processing step 140) according to the position of the character image is successively performed for each of the characters from before (from the left of) and after (from the right of) the reference character. Then, correction of the recognition results according to these judgment results (processing step 150) and the correction of the reference position with respect to the next character (processing step 190) are performed. However, in this embodiment, the correction of the reference position information is performed by the previously described method (A). In addition, in processing step 150, if the suitable character for replacement is not within the candidates, the confusion table can be searched and a suitable character found.

First, for the characters to the immediate right and left of the reference character, that is to say, the 1st and 3rd characters of the character string the position of the reference character image is used as it is as the reference position. The position of the character image of the 1st character is 4, from Table 11. Then, the difference between the reference position 10 and the position of the 1st character image is 6. If the threshold value for the attribute judgment is 3, then the 1st character image is judged to belong to group (4) of Table 3 (processing step 140).

This judged attribute is used as the basis for replacing the first candidate "P" with the second candidate "p". In addition, because the difference between the position of the 4th character image and the reference position exceeds the judgment threshold for correction of the position, there is no correction for the reference position. This reference position (12) that has not been corrected is used as the 5th character.

With respect to the 5th character image, the difference between that position (14) and the reference position (12) is smaller than the attribute judgment threshold value (3) and so the recognition results are not corrected. In addition, the difference of the positions is smaller than the position correction judgment threshold value (3) and so the reference position is corrected to the position (14) of the 4th character image. Then, this corrected reference position (14) is applied to the judgment of the attribute of the 5th character.

The 6th character image is the same and the recognition results are not corrected. The reference image is the same and the recognition results are not corrected. The reference position (14) is corrected to the position (14) of that character image. This corrected reference position is applied to the next character.

The following processing is performed in the same manner and the first candidate character string after correction becomes proposal. This is the correct answer.

The correction of the reference position in the example in Table 11 and the situation for the attribute judgment according to the position of the character image are indicated in Table 12. Here, the "p" of the second candidate (after correction according to the height) appropriate for this attribute replaces the first candidate (processing step 150). In the same manner, the 3rd character is also judged to belong to group (4) of Table 3. This judgment result is suitable for the "o" of the first candidate (after correction by height) and so the first candidate is not replaced.

The 1st character has no character on its left side and so the processing that proceeds to the left ends here while the processing that proceeds to the right side proceeds.

Then, the necessary correction of the reference position is performed in processing step 190. The position of the 3rd character image is 12. The reference position that is applied to this character is 10. The difference is 2. Then, if the judgment threshold value for position correction is 3, then the difference of positions is less than the threshold value and so the reference position is corrected to the position (12) of the 3rd character image. Then, the corrected reference position (12) is applied to the attribute judgment of 4th character.

With respect to the 4th character image, the difference between that position (6) and the reference position (12) that is applied exceeds the threshold value (3) of the attribute judgment according to the position. Moreover, that position is lower than the reference position. Accordingly, the 4th character image belongs to group (4) of Table 3.

Figure 17:
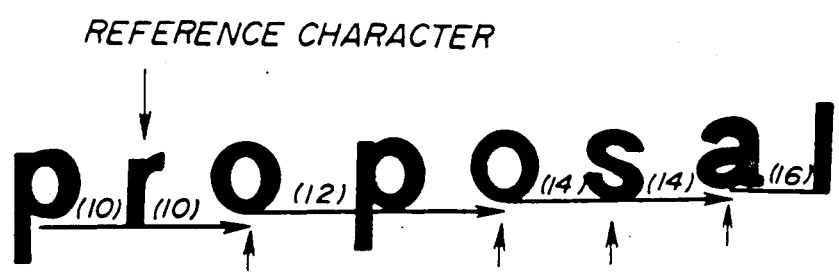
FIG. 17 is a view indicating the situation for correction of the reference position in to twelfth embodiment of a character recognition post-processing method according to the present invention.

In addition, FIG. 17 indicates the situation for the correction of the reference position. As is clear from FIG. 17, by correcting the reference position, the character string can have the recognition results accurately corrected according to the position of the character image even if the character string is greatly skewed.

TABLE 12

| Example of first candidate character after correction by height | P | r | o | P | o | s | a | l |
|---|---|---|---|---|---|---|---|---|
| Character image position | 4 | 10 | 12 | 6 | 14 | 14 | 16 | 15 |
| Applied reference position | 10 | 10 | 10 → | 12 | 12 → | 14 → | 14 → | 16 |

(where → represents that the reference position has been corrected)

Embodiment #13

The processing flow is the same as indicated in FIG. 16. However, unlike embodiment 12, the correction of the reference position in processing step 190 is performed by the previously described method (B).

The reference position is applied to each character in the following manner, where the threshold value for the position correction judgment is 3.

The 1st and the 3rd characters have the position of the reference character image applied as it is as the reference position.

With the 3rd character, the difference between the position of the character image and the reference position is three or less and so the reference position that is applied to the next character is corrected to the position (12) of the 3rd character image.

With the 4th character, the difference between the position of the character image and the reference position exceeds three and so the reference position is transferred to the next character and corrected in accordance with the previous equation (1).

That is to say, the reference position is corrected in accordance with $$P = B + \alpha \times H \quad (1)$$

The first candidate character after correction according to the height and the position of the 4th character image is 6 and so the previously determined position compensation coefficient ($\alpha$) is ½ (Refer to Table 13). Accordingly, the reference position P after correction becomes P=13.

In the following manner, the reference position is applied to each character while being successively corrected as indicated in Table 13 and FIG. 18.

TABLE 13

| | p | r | o | p | o | s | a | l |
|---|---|---|---|---|---|---|---|---|
| Example of first candidate character after correction by height | | | | | | | | |
| Character image position (B) | 4 | 10 | 12 | 6 | 14 | .14 | 16 | 15 |
| Character image height (H) | 22 | 11 | 10 | 21 | 10 | 10 | 11 | 20 |
| Position information compensation coefficient (α) | ½ | 0 | 0 | ½ | 0 | 0 | 0 | 0 |
| Applied reference position | 10 | 10 | 10→ | 12→ | 13→ | 14→ | 14→ | 16 |

In Table 13, the → mark represents that the reference position has been corrected. In addition, the position information compensation coefficient (α) is a position information compensation coefficient with respect to the first candidate character after correction according to the height and the position of the character image. This position information compensation coefficient (α) is a fixed value determined beforehand depending upon each character.

Figure 18:
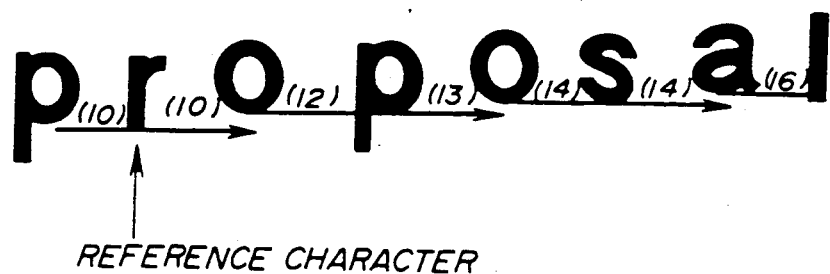
FIG. 18 is a view indicating the situation for correction of the reference position in the thirteen the embodiment of a character recognition post-processing method.

As is clear from FIG. 18, in this embodiment as well, correction of the reference position excludes the influence of skewing of the character strings.

The threshold value for the attribute judgment according to the height and the position of the character images can be changed in accordance with the height of the reference character image. In addition, all of the characters that satisfy the conditions form the reference character from among the characters in the character string, are extracted as reference character candidates, and finally, one of them can be selected as the reference character. This selection of the reference character is, for example, performed in the following manner. First, the recognition results are corrected according to the height of the character image by handling each of the reference character candidates as reference characters. Then, the respective correction results and the recognition results prior to correction are compared for the humming distance. The reference character candidate that has the smallest humming distance is selected as the reference character. In this manner, the selected reference character can also be used for correction according to the character position.

As is clear from the above explanation, the following effects can be gained from the present invention.

The processing units are character strings between spaces and a reference character is extracted from the character string. Then, information for the position and the height of an image of the reference character is used as the basis for the correction of the recognition results of each of the other characters in the character string. By this processing, it is possible to distinguish at a high level of accuracy, characters where the upper case character and the lower case character are similar, symbols that are similar, and other characters that have similar shapes even in the case of character recognition for English document where the font and the font size changes, and to then correct the mis-recognized characters. Moreover, character strings are the units of processing and so it is difficult for skewing of the document to influence the processing. It is also possible to reduce the skew compensation that is necessary to the processing in line units.

The judgment and the compensation for the types of character strings is performed after the correction according to the information for the height and the position of the character image. By this processing, the judgment accuracy of the type of character string is improved and the correction according to the type of character string is performed effectively.

Either before or after the correction according to the type of character string, an additional correction for the appropriateness of the character position within the character string (possible positions for the character in the character string) is added. By this processing, it is possible to perform correction of the recognition results even in cases where different character types exist within the character string.

In the character string, the reference position information applied to each character is successively corrected in accordance with necessity. By this processing, it is possible to correct the character recognition results without performing skew compensation processing, even if cases where the document has a considerably large amount of skew.

What is claimed is:

1. A character recognition post-processing method to be performed after recognition of characters written in a document, the method comprising:
   (a) extracting a reference character serving as a reference with respect to correcting the recognition results from a predetermined character string obtained by recognizing a character in the document;
   (b) comparing a characteristic of said reference character and the same type of characteristic of each of other characters in said character string; and
   (c) correcting recognition results of characters other than said reference character and in said character string based on results obtained in said step (b);
   wherein said step (a) comprises steps of:
      (1) extracting a plural number of characters forming candidates of a reference character;
      (2) correcting recognition results of said other characters in said character string by using each of said candidate characters as the reference character; and
      (3) selecting from said candidate characters, the character most suitable for said reference character, on the basis of correction results for each of the candidate characters.

2. The character recognition post-processing method as claimed in claim 1, wherein said step of the selection of a character that forms a suitable reference, from each of the candidate characters comprises the steps of, checking by using each of the correction results the reliability of each of the candidate characters, as the reference character, and selecting a candidate character having the highest reliability as the reference character.

3. The character recognition post-processing method as claimed in claim 2, wherein said step of checking the reliability of each of the candidate reference characters as the reference character comprises the steps of comparing the recognition results for the character string prior to correction with the recognition results for the character string after correction, and checking the number of different recognition results between the recognition results for the character string prior to correction and the recognition results for the character string after correction.

4. The character recognition post-processing method as claimed in claim 1, wherein said step of selecting from each of the candidate characters, a character that is most suitable as the reference character comprises the steps of, checking contradictions between the correction results of each candidate character, and selecting a most suitable candidate character from among those candidate characters producing contradictory results, as the reference character.

5. The character recognition post-processing method as claimed in claim 1, wherein said step of selecting from each of the candidate characters, a character that is most suitable as the reference character comprises the steps of, checking contradictions between the correction results of each candidate character, excluding those candidate characters producing contradictory results as being not suitable as a reference character, from the object candidate characters for forming a reference character, by using the correction results for the remaining candidate characters checking the reliability as the reference character of each of the candidate characters, and selecting the candidate character having the highest reliability as the reference character.

6. The character recognition post-processing method as claimed in claim 5, wherein said step checking the reliability as the reference characters of each of the candidate characters, comprises the steps of comparing the recognition results for the character string prior to correction with the recognition results for the character string after correction, and checking the number of different recognition results between the recognition results for the character string prior to correction and the recognition results for the character string after correction.

7. The character recognition post-processing method claimed in claim 1, wherein said step extracting a plural number of candidates characters for the reference character comprises the steps of, extracting as candidate characters from a recognized character string, those characters that satisfy predetermined conditions, and extracting as a final candidate characters from those extracted candidate characters, characters satisfying a further limited condition.

8. The character recognition post-processing method as claimed in claim 7, wherein said step of the selection of a character that forms a suitable reference, from each of the candidate characters comprises the steps of, checking by using each of the correction results, the reliability of each of the candidate reference characters, as the reference character and selecting a candidate character having the highest reliability as the reference character.

9. The character recognition post-processing method as claimed in claim in 7, wherein said step of selecting from each of the candidate characters, a character that is most suitable as the reference character comprises the steps of, checking contradictions between the correction results of each candidate character, and selecting a most suitable candidate character from among those candidate characters producing contradictory results, as the reference character.

10. The character recognition post-processing method as claimed in claim 7, wherein said step of selecting from each of the candidate characters, a character that is most suitable as the reference character comprises the steps of, checking contradictions between the correction results of each candidate character, excluding those candidate characters producing contradictory results as being not suitable as a reference character, from the object candidate characters for forming a reference character, checking by using the correction results for the remaining candidate characters the reliability as the reference characters of each of the candidate characters, and selecting the candidate character having the highest reliability as the reference character.

11. A character recognition post-processing method to be performed after recognition of characters written in a document, the method comprising:
  (a) extracting a reference character serving as a reference with respect to correcting the recognition results from a predetermined character string obtained by recognizing a character in the document;
  (b) comparing a characteristic of said reference character and the same type of characteristic of each of other characters in said character string;
  (c) correcting recognition results of characters other than said reference character and in said character string based on results obtained in said step (b); and
  (d) when a character can not be extracted as the reference character from a character string for which the recognition results should be corrected, extracting a character as the reference character from another string in the document for which recognition results have been obtained.

12. The character recognition post-processing method as claimed in claim 11, further comprising the steps of, correcting by using characteristic for the reference character which has been extracted from another character string, the recognition results of another character in a character string, judging by using the correction results, whether or not said extracted reference character is suitable, and if not, making said correction of said recognition results invalid.

13. A character recognition post-processing method to be performed after recognition of characters written in a document, the method comprising:
  (a) extracting a reference character serving as a reference with respect to correcting the recognition results from a predetermined character string obtained by recognizing a character in the document;
  (b) comparing a characteristic of said reference character and the same type of characteristic of each of other characters in said character string;
  (c) correcting recognition results of characters other than said reference character and in said character string based on results obtained in said step (b);
  (d) presuming a character string type on the basis of corrected recognition results, and
  (e) further correcting said corrected recognition results so that the correction result is suitable for said presumed character string type obtained in said step (d).

14. The character recognition post-processing method as claimed in claim 13, further comprising:
  judging whether or not a position of a character in a character string is appropriate; and
  further correcting by using the judgment results, said recognition results.

15. A character recognition post-processing method to be performed after recognition of characters written in a document, the method comprising:
  (a) extracting a reference character serving as a reference with respect to correcting the recognition results from a predetermined character string obtained by recognizing a character in the document;

(b) comparing a characteristic of said reference character and the same type of characteristic of each of other characters in said character string;

(c) correcting recognition results of characters other than said reference character and in said character string based on results obtained in said step (b), wherein the recognition results are corrected in the order of from the first reference character to successively adjacent characters; and (d) correcting a recognition result for each character, on the basis of comparison result for a reference position and the position of each character in a perpendicular direction with respect to a line, and (e) correcting the reference position on the basis of a position of each character in a perpendicular direction with respect to a line, and where a position of the reference character in a perpendicular direction with respect to a line is an initial value, said corrected reference position being applied to successively adjacent characters.

16. The character recognition post-processing method as claimed in claim 15, wherein said reference position correction step comprises:

determining a difference between an applied reference position and a position of a character in a perpendicular direction with respect to a line, determining a new reference position as a position of that character in a perpendicular direction with respect to a line when that difference is not more than a predetermined threshold value, and not correcting the reference position used until then, and proceeding to the next character when that difference is more than the predetermined threshold value.

17. The character recognition post-processing method as claimed in claim 15, wherein said step of correcting a reference position comprises:

determining a difference between an applied reference position and a position of a character in a perpendicular direction with respect to a line, determining a new reference position as a position of that character in a perpendicular direction with respect to a line when that difference is not more than a predetermined threshold value, and determining a position obtained from a predetermined calculation on the basis of the height of a character and the position of that character in the direction perpendicular with respect to a line of that character, as a new reference value when that difference is more than the predetermined threshold value.

18. A character recognition post-processing method to be performed after recognition of characters written in a document, the method comprising:

(a) extracting a first reference character serving as a reference with respect to correction of the recognition results from a predetermined character string obtained by recognizing characters in the document, said first reference character having a substantially constant relative height without regard to the fonts which can be used in documents;

(b) comparing a height of said first reference character and a height of each of other characters in said character string; and (c) correcting the recognition results of characters other than said first reference character and in said character string based on results obtained in said step (b).

19. The character recognition post-processing method as claimed in claim 18, wherein:

said step (b) comprises using said comparison to judge an attribute of each of said other characters on the basis of a character height; and said step (c) comprises correcting said recognition results for each of said other characters so that the correction result is suitable for said judged attribute.

20. The character recognition post-processing method as claimed in claim 18, wherein the recognition results are corrected in the order of from the first reference character to successively adjacent characters.

21. The character recognition post-processing method as claimed in claim 18, further comprising the steps of:

(d) extracting a second reference character serving as a reference with respect to correction of recognition results from a character string obtained in said step (c), said second reference character having a substantially constant relative position perpendicular with respect to a line of said second reference character without regard to the fonts which can be used in documents;

(e) comparing a position perpendicular with respect to a line of said second reference character and a position perpendicular with respect to a line of each of other characters in said character string obtained in said step (c); and (f) correcting the recognition results of characters other than said second reference character and in said character string obtained in said step (c) based on results obtained in said step (e).

22. A character recognition post-processing method to be performed after recognition of characters written in a document, the method comprising:

(a) extracting a second reference character serving as a reference with respect to correction of recognition results from a predetermined character string obtained by recognizing a character in the document, said second reference character having a substantially constant relative position perpendicular to a line of said second reference character without regard to the fonts which can be used in documents;

(b) comparing a position perpendicular to a line of said second reference character and a position perpendicular to a line of each of other characters in said character string; and (c) correcting the recognition results of characters in said character string other than said second reference character based on results obtained in said step (b).

23. The character recognition post-processing method as claimed in claim 22, wherein:

said step (b) comprises using said comparison to judge an attribute of each of said other characters on the basis of the position of a character; and said step (c) comprises correcting said recognition results for each of said other characters so that the correction result is suitable for said judged attribute.

24. The character recognition post-processing method as claimed in claim 22, further comprising:

(d) extracting a first reference character serving as a reference with respect to correction of the recognition results from a character string obtained in said step (c), said first reference character having a substantially constant relative height without regard to the fonts which can be used in documents;

(e) comparing a height of said first reference character and a height of each of other characters in said character string obtained in said step (c); and (f) correcting the recognition results of characters other than said first reference character and in said character string obtained in said step (c) based on results obtained in said step (e).

25. The character recognition post-processing method as claimed in claim 22, wherein:

the recognition results are corrected in an order starting from the second reference character to successively adjacent characters.

* * * * *